(12) United States Patent
Lee et al.

(10) Patent No.: US 10,574,080 B2
(45) Date of Patent: Feb. 25, 2020

(54) METHOD FOR DETERMINING CROSS CONNECTION IN WIRELESS CHARGING

(71) Applicant: Samsung Electronics Co., Ltd., Gyeonggi-do (KR)

(72) Inventors: Kyung-Woo Lee, Seoul (KR); Hee-Won Jung, Gyeonggi-do (KR)

(73) Assignee: Samsung Electronics Co., Ltd (KR)

(*) Notice: Subject to any disclaimer, the term of this patent is extended or adjusted under 35 U.S.C. 154(b) by 68 days.

(21) Appl. No.: 14/825,365

(22) Filed: Aug. 13, 2015

(65) Prior Publication Data

US 2016/0049826 A1 Feb. 18, 2016

(30) Foreign Application Priority Data

Aug. 13, 2014 (KR) ........................ 10-2014-0105249

(51) Int. Cl.
*H02J 7/00* (2006.01)
*H02J 7/02* (2016.01)
*H02J 50/80* (2016.01)
*H02J 50/40* (2016.01)
*H02J 50/12* (2016.01)

(52) U.S. Cl.
CPC .............. *H02J 7/025* (2013.01); *H02J 50/12* (2016.02); *H02J 50/40* (2016.02); *H02J 50/80* (2016.02)

(58) Field of Classification Search
CPC .. H02J 7/025; H02J 5/005; H02J 50/80; H02J 17/00; H02J 50/12; H02J 50/40; H02J 2007/0096; H02J 50/10; H02J 2007/0098; H02J 50/70; H02J 50/60; H02J 7/045; H02J 2007/005; H02J 50/00; H02J 7/007; H02J 2007/0001; H02J 7/02; H02J 50/90; H02J 7/0047; H02J 7/047; H02J 7/0011; H02J 7/04; H02J 7/0031; H02J 7/0054; H02J 50/20; H02J 50/23; H02J 7/0029; H02J 7/0052; H04B 5/0037; H04B 5/0031; H04B 5/0075; H04B 5/0081; H04B 17/318;
(Continued)

(56) References Cited

U.S. PATENT DOCUMENTS

2009/0001929 A1 1/2009 Posamentier
2012/0104867 A1 5/2012 Mudrick et al.
(Continued)

FOREIGN PATENT DOCUMENTS

KR 10-2014-0031780 3/2014
WO WO 2014/062019 4/2014

OTHER PUBLICATIONS

International Search Report dated Oct. 23, 2015 issued in counterpart application No. PCT/KR2015/008452, 7 pages.
(Continued)

*Primary Examiner* — Binh C Tat
(74) *Attorney, Agent, or Firm* — The Farrell Law Firm, P.C.

(57) ABSTRACT

A method and an apparatus are provided for determining a cross connection during wireless charging. The method includes receiving changed voltage setting information from a wireless power receiver, transmitting power adjusted according to the received voltage setting information, receiving measured voltage information from the wireless power receiver, and determining whether a cross connection occurs based on the voltage setting information and the measured voltage information.

28 Claims, 15 Drawing Sheets

(58) Field of Classification Search
CPC .............. H04W 52/0277; H04W 4/80; G01R 19/16538
USPC ................................................ 320/106–115
See application file for complete search history.

(56) References Cited

U.S. PATENT DOCUMENTS

| | | | |
|---|---|---|---|
| 2012/0112692 A1* | 5/2012 | Arai ................. | G06Q 50/06 320/108 |
| 2012/0326660 A1* | 12/2012 | Lu .................... | H02J 17/00 320/108 |
| 2013/0181665 A1 | 7/2013 | Lee et al. | |
| 2014/0015330 A1 | 1/2014 | Byun et al. | |
| 2014/0062395 A1 | 3/2014 | Kwon et al. | |
| 2014/0111018 A1* | 4/2014 | Kwon ................ | H02J 5/005 307/104 |
| 2014/0111153 A1* | 4/2014 | Kwon ................ | H02J 7/025 320/108 |
| 2014/0159641 A1 | 6/2014 | Geren | |
| 2014/0159653 A1 | 6/2014 | Von Novak et al. | |
| 2014/0285142 A1* | 9/2014 | Lee .................... | H02J 7/007 320/108 |
| 2014/0285143 A1* | 9/2014 | Kwon ................ | H02J 7/007 320/108 |

OTHER PUBLICATIONS

European Search Report dated Mar. 22, 2018 issued in counterpart application No. 15832249.5-1202, 5 pages.

* cited by examiner

METHOD FOR DETERMINING CROSS CONNECTION IN WIRELESS CHARGING

PRIORITY

This application claims priority under 35 U.S.C. § 119(a) to Korean Patent Application Serial No. 10-2014-0105249, which was filed in the Korean Intellectual Property Office on Aug. 13, 2014, the entire disclosure of which is incorporated herein by reference.

BACKGROUND

1. Field of the Disclosure

The present disclosure relates generally to wireless charging, and more particularly, to a method for determining a cross connection during wireless charging.

2. Description of the Related Art

Wireless charging is based on wireless power transmission and reception. For example, when a portable phone is placed on a charging pad, without being connected to an additional charging connector, a battery in the portable phone is charged.

Wireless charging offers benefits of increased waterproofing due to the removal of a charging port and enhanced portability due to the elimination of carrying a wired charger for an electronic device.

There are three basic wireless charging schemes: (1) electromagnetic induction using coils, (2) resonance-based, and (3) Radio Frequency (RF)/microwave radiation, which is based on conversion of electric energy to microwaves.

The electromagnetic induction-based power transmission transfers power between primary and secondary coils. When a magnet moves through a coil, current is induced. Based on this principle, a transmitter creates a magnetic field and a receiver produces energy from current induced by a change in the magnetic field. This phenomenon is commonly referred to as "magnetic induction" and power transmission based on magnetic induction is highly efficient.

The resonance-based power transmission resonates electromagnetic waves carrying electric energy, instead of sound. The resonant electrical energy is directly transferred only to a device having the same resonant frequency, while the unused electric energy is reabsorbed into the electromagnetic field, rather than being dispersed in the air. Thus, the resonant electrical energy does not affect nearby machines or human bodies, compared to other electronic waves.

A wireless power transmitter and a wireless power receiver may communicate with each other based on a predetermined method, for example, a ZigBee scheme or a Bluetooth Low Energy (BLE) scheme. By using an out-band method such as ZigBee or BLE, an available distance of communication increases. Thus, even when the wireless power transmitter and the wireless power receiver have a relatively long distance therebetween, the transmitter and receiver may still communicate with each other. That is, even at distance in which the wireless power transmitter will have difficulty in transmitting wireless power, the wireless power transmitter may still be able to communicate with the wireless power receiver.

FIG. 1 illustrates a cross connection that occurs in conventional wireless charging systems.

Referring to FIG. 1, a first wireless power receiver RX1 is disposed on a first wireless power transmitter TX1 and a second wireless power receiver RX2 is disposed on a second wireless power transmitter TX2. Herein, the first wireless power transmitter TX1 transmits power to the first wireless power receiver RX1 and the second wireless power transmitter TX2 transmits power to the second wireless power receiver RX2. Thus, the first wireless power transmitter TX1 communicates with the first wireless power receiver RX1, and the second wireless power transmitter TX2 communicates with the second wireless power receiver RX2.

However, due to increased communication distances, the first wireless power receiver RX1 may also join a wireless power network controlled by the second wireless power transmitter TX2 and the second wireless power receiver RX2 may also join a wireless power network controlled by the first wireless power transmitter TX1, which is referred to as a "cross connection". As a result, the first wireless power transmitter TX1 may transmit power requested by the second wireless power receiver RX2, instead of power requested by the first wireless power receiver RX1. For example, if a power capability of the second wireless power receiver RX2 is greater than that of the first wireless power receiver RX1, over-capability power may be applied to the first wireless power receiver RX1. Further, if the capability of the second wireless power receiver RX2 is less than that of the first wireless power receiver RX1, the first wireless power receiver RX1 may not receive enough power to efficiently charge the first wireless power receiver RX1.

SUMMARY

Accordingly, the present disclosure is made to address at least the above-mentioned problems and/or disadvantages that may be generated in a cross connection and to provide at least the advantages described below.

An aspect of the present disclosure is to provide a method for determining a cross connection during wireless charging by identifying a cross-connected wireless power receiver.

In accordance with an aspect of the present disclosure, a method is provided for determining a cross connection during wireless charging. The method includes receiving changed voltage setting information from a wireless power receiver, transmitting power adjusted according to the received voltage setting information, receiving measured voltage information from the wireless power receiver, and determining whether a cross connection occurs based on the voltage setting information and the measured voltage information.

In accordance with another aspect of the present disclosure, a method is provided for determining a cross connection during wireless charging. The method includes changing voltage setting information, transmitting the changed voltage setting information to a wireless power transmitter, receiving power from the wireless power transmitter, measuring a charging voltage based on the received power, and determining whether a cross connection occurs based on the measured charging voltage and the changed voltage setting information.

In accordance with another aspect of the present disclosure, an apparatus is provided for determining a cross connection during wireless charging. The apparatus includes a transceiver for receiving changed voltage setting information from a wireless power receiver; a wireless power transmitter for transmitting power adjusted according to the received voltage setting information, and a controller for receiving, via the transceiver, measured voltage information from the wireless power receiver, and determining whether a cross connection occurs based on the voltage setting information and the measured voltage information.

In accordance with another aspect of the present disclosure, an apparatus is provided for determining a cross connection during wireless charging. The apparatus includes a controller for changing voltage setting information, a transceiver for transmitting the changed voltage setting information to a wireless power transmitter, and a wireless power receiver for receiving power from the wireless power transmitter. The controller measures a charging voltage based on the received power, and determines whether a cross connection occurs, based on the measured charging voltage and the changed voltage setting information.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION OF EMBODIMENTS OF THE DISCLOSURE

The following description with reference to the accompanying drawings is provided to assist in a comprehensive understanding of certain embodiments of the disclosure, as will be defined by the claims and their equivalents. It includes various specific details to assist in that understanding, but these are to be regarded as merely exemplary. Accordingly, those of ordinary skill in the art will recognize that various changes and modifications of the embodiments described herein can be made without departing from the scope and spirit of the disclosure. In addition, descriptions of well-known functions and constructions may be omitted for clarity and conciseness.

The terms and words used in the following description and claims are not limited to their dictionary meanings, but are merely used to provide a clear and consistent understanding of the disclosure. Accordingly, it should be apparent to those skilled in the art that the following description is provided for illustration purposes only and not for the purpose of limiting the disclosure as defined by the appended claims and their equivalents.

Herein, singular forms "a," "an," and "the" include plural referents unless the context clearly dictates otherwise. Thus, for example, reference to "a component surface" includes reference to one or more of such surfaces.

Figure 1:
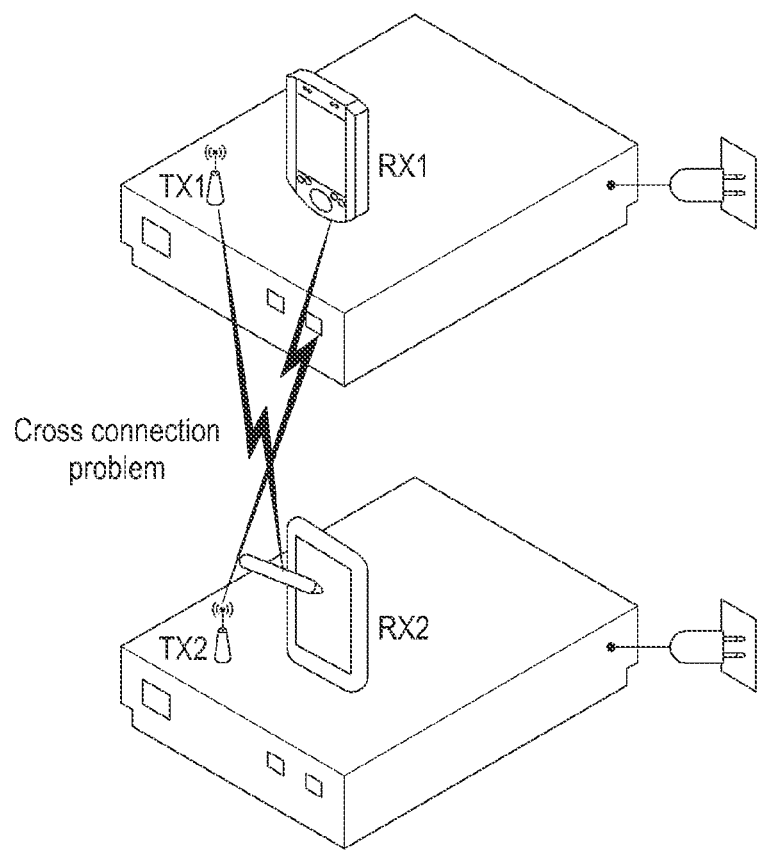
FIG. 1 illustrates a cross connection that occurs in conventional wireless charging systems.
Figure 2:
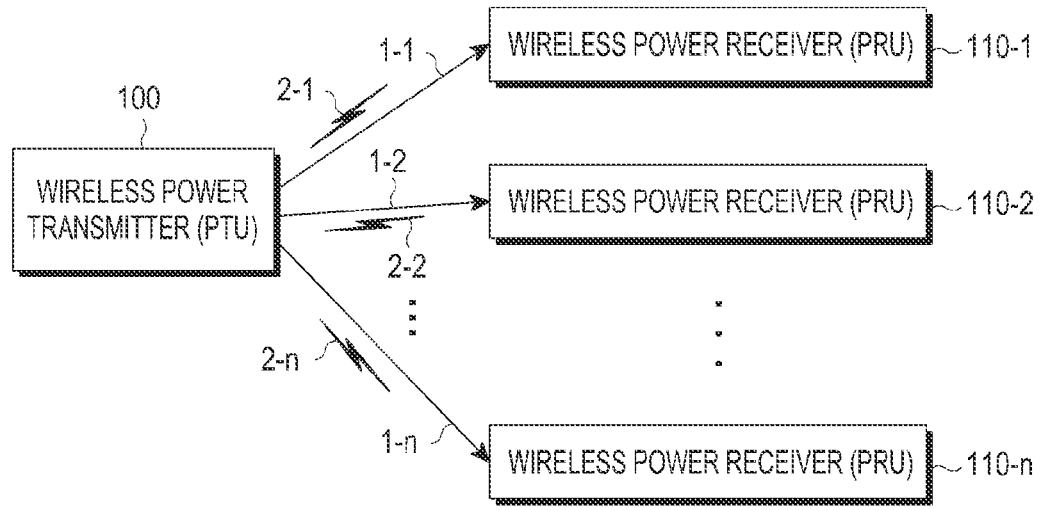
FIG. 2 illustrates an operation of a wireless charging system according to an embodiment of the present disclosure.

FIG. 2 illustrates an operation of a wireless charging system according to an embodiment of the present disclosure.

Referring to FIG. 2, the wireless charging system includes a wireless power transmitter (or Power Transmitting Unit (PTU)) 100 and wireless power receivers (or Power Receiving Units (PRUs)) 110-1, 110-2, . . . , and 110-$n$. The wireless power receivers 110-1, 110-2, . . . , and 110-$n$ may be configured, for example, as mobile communication terminals, Personal Digital Assistants (PDAs), Personal Multimedia Players (PMPs), smartphones, etc.

The wireless power transmitter 100 wirelessly transmits power 1-1, 1-2, . . . , and 1-$n$, respectively, to the wireless power receivers 110-1, 110-2, . . . , and 110-$n$. More specifically, the wireless power transmitter 100 wirelessly transmits the power 1-1, 1-2, . . . , and 1-$n$ to wireless power receivers that have been authenticated in a predetermined authentication procedure.

The wireless power transmitter 100 may establish electrical connections to the wireless power receivers 110-1, 110-2, . . . , and 110-$n$. For example, the wireless power transmitter 100 may transmit wireless power in the form of electromagnetic waves to the wireless power receivers 110-1, 110-2, . . . , and 110-$n$.

The wireless power transmitter 100 may also conduct bi-directional communication with the wireless power receivers 110-1, 110-2, . . . , and 110-$n$. The wireless power transmitter 100 and the wireless power receivers 110-1, 110-2, . . . , and 110-$n$ may process and/or transmit/receive packets 2-1, 2-2, . . . , and 2-$n$ configured in predetermined frames.

The wireless power transmitter 100 transmits power wirelessly to the plurality of wireless power receivers 110-1, 110-2, . . . , and 110-$n$. For example, the wireless power transmitter 100 may transmit power to the wireless power receivers 110-1, 110-2, . . . , and 110-$n$ by resonance. In such an example, if the wireless power transmitter 100 adopts the resonance scheme, the distance between the wireless power transmitter 100 and the wireless power receivers 110-1, 110-2, . . . , and 110-n may be, for example, 30 m or smaller.

If the wireless power transmitter 100 adopts an electromagnetic induction scheme, the distance between the wireless power transmitter 100 and the wireless power receivers 110-1, 110-2, . . . , and 110-n may be, for example, 10 cm or smaller.

The wireless power receivers 110-1, 110-2, . . . , and 110-n receive wireless power from the wireless power transmitter 100 and charge their internal batteries. Further, the wireless power receivers 110-1, 110-2, . . . , and 110-n may transmit, to the wireless power transmitter 100, a signal requesting wireless power transmission, information required for wireless power reception, wireless power receiver state information, control information for the wireless power transmitter 100, etc.

Each of the wireless power receivers 110-1, 110-2, . . . , and 110-n may also transmit a message indicating its charged state to the wireless power transmitter 100.

The wireless power transmitter 100 may include a display that displays the state of each of the wireless power receivers 110-1, 110-2, . . . , and 110-n based on the messages received from the wireless power receivers 110-1, 110-2, . . . , and 110-n. Further, the wireless power transmitter 100 may display a time expected until each of the wireless power receivers 110-1, 110-2, . . . , and 110-n is completely charged.

The wireless power transmitter 100 may transmit a control signal for disabling a wireless charging function to the wireless power receivers 110-1, 110-2, . . . , and 110-n. Upon receipt of the control signal for disabling the wireless charging function from the wireless power transmitter 100, a wireless power receiver disables its wireless charging function.

Figure 3A:
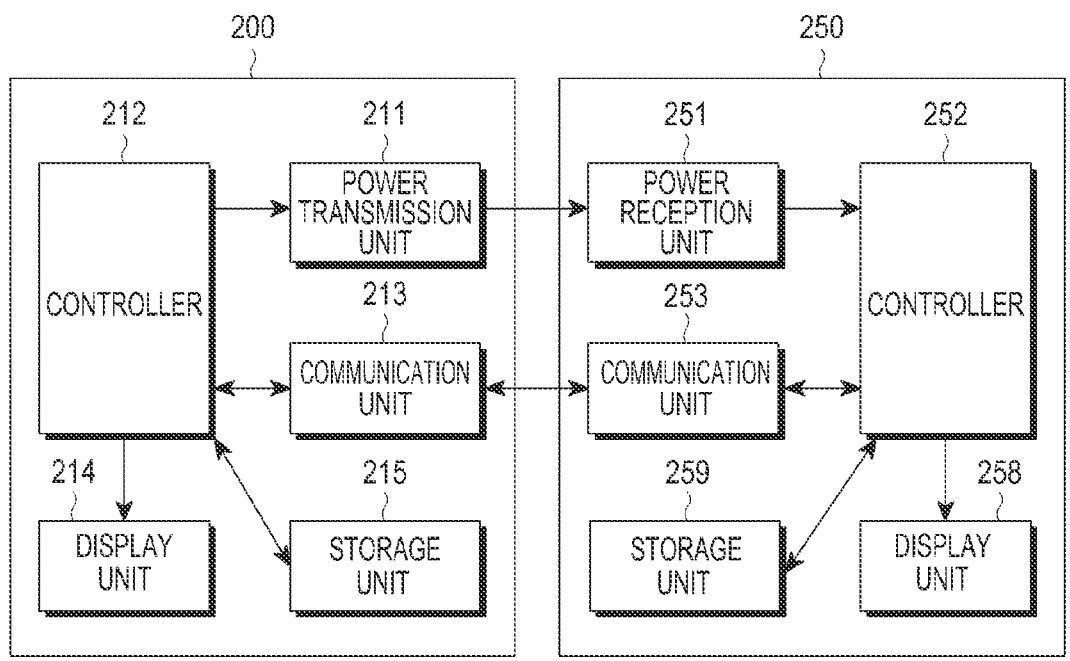
FIG. 3A illustrates a wireless power transmitter and a wireless power receiver according to an embodiment of the present disclosure.

FIG. 3A illustrates a wireless power transmitter and a wireless power receiver according to an embodiment of the present disclosure.

Referring to FIG. 3A, a wireless power transmitter 200 includes a power transmitter 211, a controller 212, a communication unit 213, a display unit 214, and a storage unit 215.

The power transmitter 211 wirelessly supplies power to a wireless power receiver 250. The power transmitter 211 may supply power in Alternate Current (AC) waveforms or by converting power in Direct Current (DC) waveforms to power in AC waveforms using an inverter. The power transmitter 211 may include a built-in battery or may receive power from an outside source, e.g., an electrical outlet, and supply the power to other components.

The controller 212 provides overall control to the wireless power transmitter 200, e.g., using an algorithm, a program, or an application for a control operation, read from the storage unit 215. The controller 212 may be configured as a Central Processing Unit (CPU), a microprocessor, a mini computer, etc.

The communication unit 213 communicates with the wireless power receiver 250 in a predetermined communication scheme. The communication unit 213 may receive, from the wireless power receiver 250, power information including information about at least one of the capacity of the wireless power receiver 250, residual battery amount of the wireless power receiver 250, use amount of the wireless power receiver 250, battery capacity of the wireless power receiver 250, battery residual proportion of the wireless power receiver 250, etc. The power information may also include information about insertion of a wired charging terminal, transition from a Stand Alone (SA) mode to a Non-Stand Alone (NSA) mode, error state release, etc.

Further, the communication unit 213 may transmit a charging function control signal for controlling the charging function of the wireless power receiver 250. For example, the charging function control signal may enable or disable the charging function by controlling a power receiver 251 of the wireless power receiver 250.

The charging function control signal may also include information associated with determination of a cross connection (or cross connection related information). For example, the charging function control signal may include identification information and setting information for cross connection determination, and pattern or time information associated with a load change of the wireless power receiver 250 for cross connection determination.

According to an embodiment of the present disclosure, the communication unit 213 may receive an Advertisement (AD) signal from the wireless power receiver 250, and the AD signal may include information associated with identification information of the wireless power transmitter 200. Obviously, the communication unit 213 may also receive a signal from another wireless power transmitter.

The controller 212 may display a state of the wireless power receiver 250 on the display unit 214 based on a message received from the wireless power receiver 250 through the communication unit 213. Further, the controller 212 may display a time expected until the wireless power receiver 250 is completely charged on the display unit 214.

The wireless power receiver 250 includes the power receiver 251, a controller 252, a communication unit 253, a display unit 258, and a storage unit 259.

The power receiver 251 receives power wirelessly from the wireless power transmitter 200, e.g., in AC waveforms.

The controller 252 may provide overall control to the wireless power receiver 250, e.g., using an algorithm, a program, or an application required for a control operation, read from the storage unit 259. The controller 252 may be configured as a CPU, a microprocessor, a mini computer, etc.

The controller 252 may also detect the identification information of the wireless power transmitter 200 from a power signal received by the power receiver 251.

The communication unit 253 communicates with the wireless power transmitter 200 in a predetermined communication scheme. The communication unit 253 may transmit, to the wireless power transmitter 200, power information including information about at least one of the capacity of the wireless power receiver 250, the residual battery amount of the wireless power receiver 250, the use amount of the wireless power receiver 250, the battery capacity of the wireless power receiver 250, battery residual proportion of the wireless power receiver 250, etc. The power information may also include information about insertion of a wired charging terminal, transition from the SA mode to the NSA mode, error state release, etc.

Further, the communication unit 253 may transmit or receive a charging function control signal for controlling the charging function of the wireless power receiver 250. The charging function control signal enables or disables the charging function by controlling the power receiver 251.

The charging function control signal may also include cross connection related information. For example, the charging function control signal may include identification information and setting information for cross connection determination, and pattern or time information associated with a load change of the wireless power receiver 250 for cross connection determination.

Further, the communication unit 253 may transmit a signal including identification information of the wireless power transmitter 200 detected by the controller 252 to the wireless power transmitter 200. For example, the signal including the identification information of the wireless power transmitter 200 may be an AD signal.

The controller 252 may display a state of the wireless power receiver 250 on the display unit 258. Further, the controller 252 may display a time expected until the wireless power receiver 250 is completely charged on the display unit 258.

While the power transmitter 211 and the communication unit 213 are illustrated as different components so that the wireless power transmitter 200 communicates using an out-band method in FIG. 3A, alternatively, the power transmitter 211 and the communication unit 213 may also be implemented as a single component, such that the wireless power transmitter 200 may communicate using an in-band method.

Figure 3B:
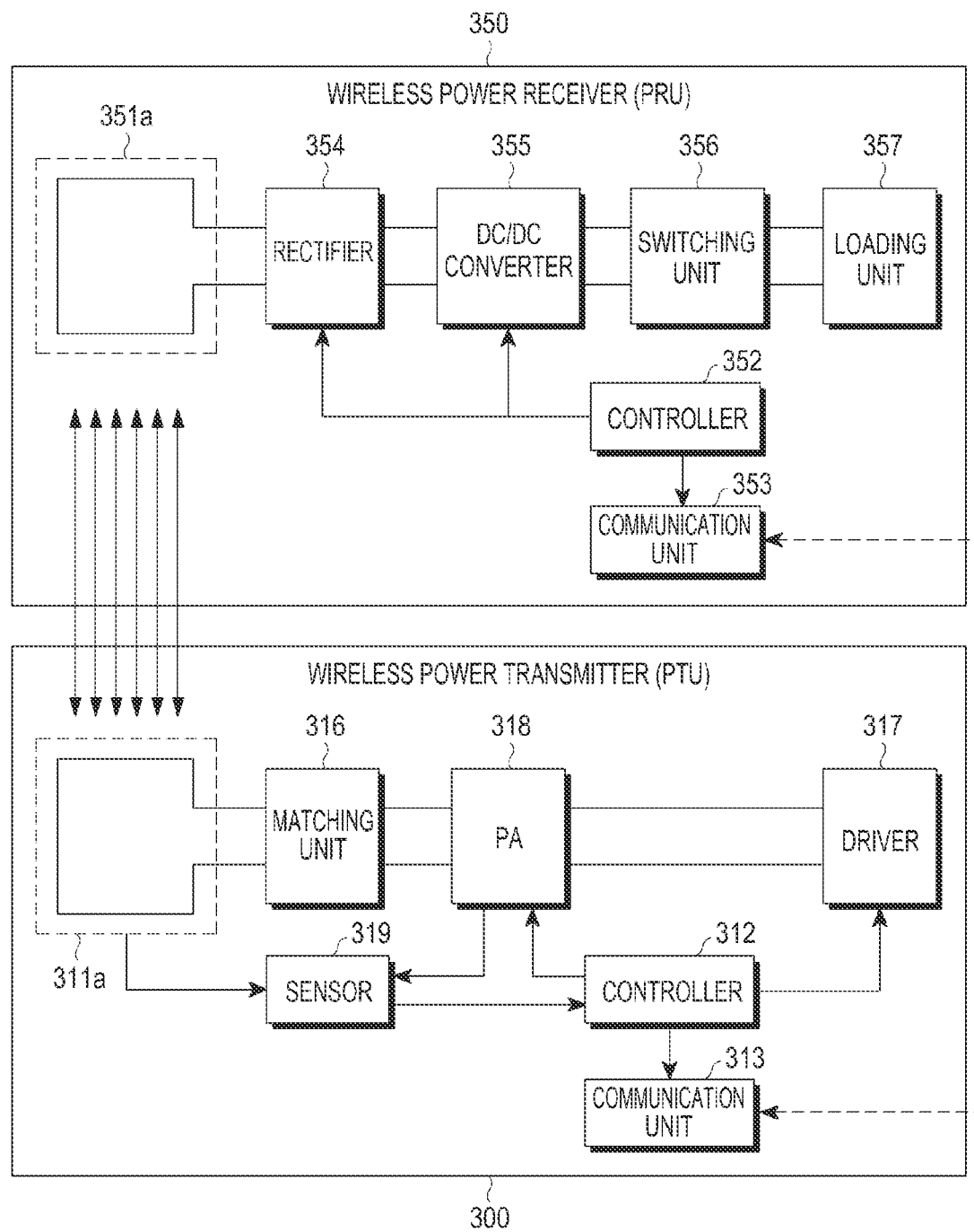
FIG. 3B illustrates a wireless power transmitter and a wireless power receiver according to an embodiment of the present disclosure.

FIG. 3B illustrates a wireless power transmitter and a wireless power receiver according to an embodiment of the present disclosure.

Referring to FIG. 3B, a wireless power transmitter 300 includes a Transmission (Tx) resonator 311a, a controller 312 (for example, a Micro Controller Unit (MCU)), a communication unit 313, a matching unit 316, a driver (power supply) 317, a Power Amplifier (PA) 318, and a sensing unit 319.

The wireless power receiver 350 includes a Reception (Rx) resonator 351a, a controller 352, a communication unit 353, a rectifier 354, a DC/DC converter 355, a switching unit 356, and a loading unit 357.

The driver 317 may output DC power having a predetermined voltage value. The voltage value of the DC power output from the driver 317 may be controlled by the controller 312.

A DC current output from the driver 317 may be applied to the PA 318. The PA 318 amplifies the DC current with a predetermined gain. Further, the PA 318 may convert DC power to AC power based on a signal received from the controller 312. Therefore, the PA 318 may output AC power.

The matching unit 316 performs impedance matching. For example, the matching unit 316 may control impedance viewed from the matching unit 316 so that its output power may have high efficiency or high power. The sensing unit 319 may sense a load variation of the wireless power receiver 350 through the Tx resonator 311a or the PA 318 and provide the sensing result to the controller 312.

The matching unit 316 may adjust impedance under control of the controller 312. For example, the matching unit 316 may include at least one of a coil and a capacitor. The controller 312 may control a connection state to at least one of the coil and the capacitor, and thus, may control impedance matching accordingly.

The Tx resonator 311a may transmit input AC power to the Rx resonator 351a. The Tx resonator 311a and the Rx resonator 351a may be configured as resonant circuits having the same resonant frequency, e.g., 6.78 MHz.

The communication unit 313 communicates with the communication unit 353 of the wireless power receiver 350, for example, bi-directionally in 2.4 GHz (by Wireless Fidelity (WiFi), ZigBee, or Bluetooth (BT)/BLE).

The Rx resonator 351a receives power for charging. Further, the Rx resonator 351a may receive a signal including identification information of the wireless power transmitter 300. For example, the signal including the identification information of the wireless power transmitter 300 may be included in power for charging (or charging power).

The rectifier 354 rectifies wireless power received from the Rx resonator 351a to DC power. For example, the rectifier 354 may be configured as a bridge diode.

The DC/DC converter 355 converts the rectified power with a predetermined gain, e.g., so that the voltage of its output end is 5V. A minimum voltage value and a maximum voltage value that may be applied to the input end of the DC/DC converter 355 may be preset.

The switching unit 356 connects the DC/DC converter 355 to the loading unit 357. The switching unit 356 may be kept in an ON or OFF state under the control of the controller 352. If the switching unit 356 is in the ON state, the loading unit 357 may store the converted power received from the DC/DC converter 355. Alternatively, the switching unit 356 may be omitted.

Figure 3C:
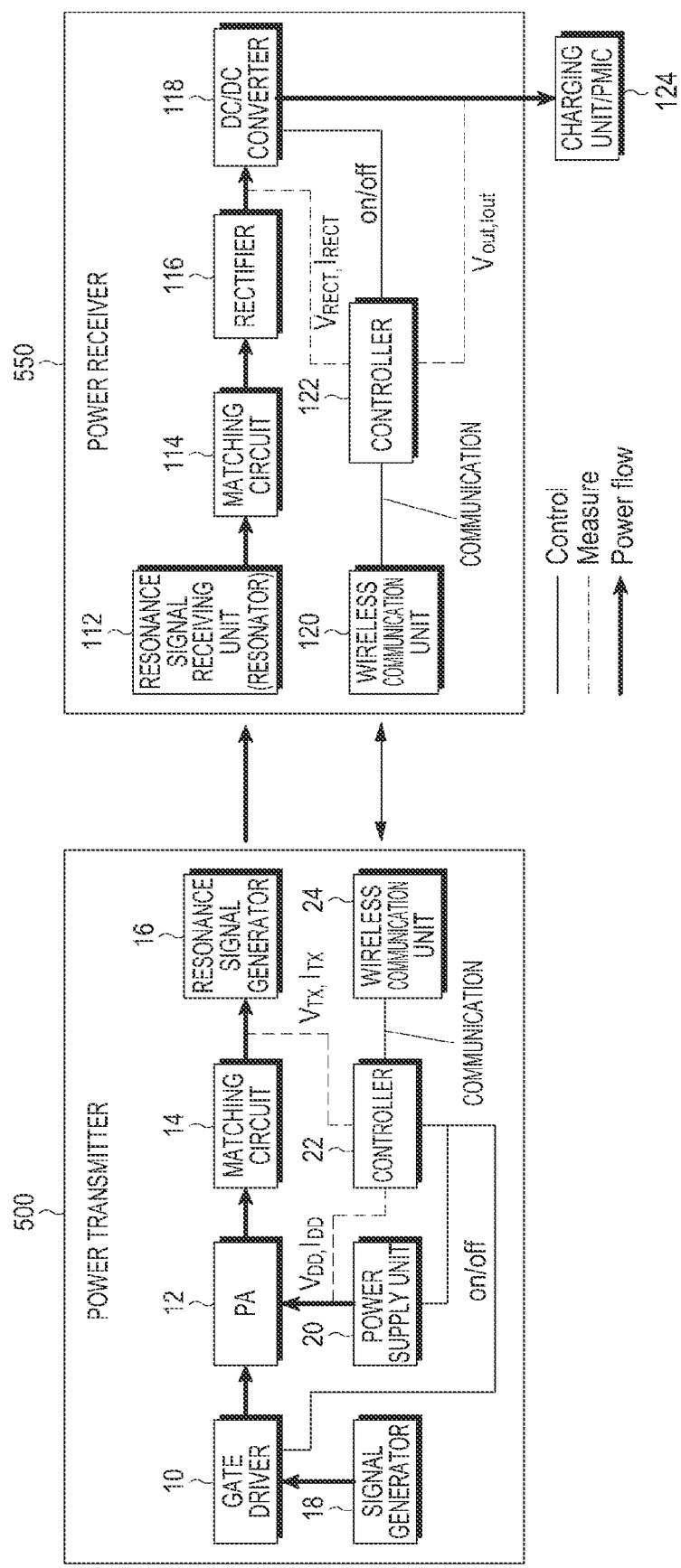
FIG. 3C illustrates a wireless power transmitter and a wireless power receiver according to an embodiment of the present disclosure.

FIG. 3C illustrates a wireless power transmitter and a wireless power receiver according to an embodiment of the present disclosure. Specifically, FIG. 3C illustrates a voltage and a current at a wireless power transmitter 400 and a voltage and a current at a wireless power receiver 450, which are used to check cross connection.

Referring to FIG. 3C, the wireless power transmitter 500 includes a signal generator 18 including a Voltage Control Oscillator (VCO), a Power Amplifier (PA) 12 for receiving a frequency signal in a predetermined range, output from the signal generator 18, through a gate driver 10, and amplifying the frequency signal to a high-power frequency signal, a power supply unit 20 for supplying a power source to output a signal of a frequency output from the signal generator 18 as a signal of a resonance frequency determined by a controller 22, a matching unit 14 for performing impedance matching, a resonance signal generator 16 for transmitting power from the power supply unit 20 to one or more power receivers through a wireless resonance signal according to the high-power signal generated by the PA 12, and the controller 22 for controlling a wireless power transmission operation of the power transmitter 200.

For example, the controller 22 measures a voltage $V_{DD}$ and a current $I_{DD}$ generated in the power supply unit 20 and monitors a current $I_{TX}$ and a voltage $V_{TX}$ of a wirelessly transmitted resonance signal. Although measurement of the voltage $V_{DD}$ and the current $I_{DD}$ and monitoring of the current $I_{TX}$ and the voltage $V_{TX}$ are performed in the controller 22 in FIG. 3C, a separate voltage/current measurement unit for such measurement and monitoring may also be provided.

The wireless power transmitter 500 performs charging of the wireless power receiver 550 located within a charging area, for example, on a charging pad. Further, a plurality of wireless power receivers may exist within an effective distance of the charging area. In this case, the wireless power transmitter 500 may be cross connected with a wireless power receiver other than the wireless power receiver 550 located on the charging pad. To prevent such cross connection, the controller 22 may identify an effective wireless power receiver.

The controller 22 may determine cross connection prior starting charging or during charging.

After identifying the cross connection, the wireless power transmitter 500 may transmit a command for requesting termination of the cross connection to the wireless power receiver 550. The command for requesting termination of the cross connection allows the wireless power receiver 550 to terminate connection with the wireless power transmitter 500 over the wireless power network and then to form a new wireless power network with another wireless power transmitter. The command for requesting termination of cross connection may be sent to the wireless power receiver 550 using an out-of-band method (for example, a wireless communication unit 24). Thus, the wireless power receiver 550 may start creation of a wireless power network with another wireless power transmitter.

The wireless power transmitter 500 may also exclude a cross connected wireless power receiver by sending a command for forming a network with another wireless power transmitter or a command for switching to a standby mode to the wireless power receiver 550.

According to various embodiments of the present disclosure, before charging starts, the controller 22 controls power transmission for driving the wireless power receiver 550.

Before charging starts, the controller 22 may determine, after detecting a load, that the wireless power receiver 550 is located on a charging area. Once the controller 22 controls power transmission for driving the wireless power receiver 550, the wireless power receiver 550 is driven by the received power and then performs a series of operations for joining a wireless power network of the power transmitter 500.

According to an embodiment of the present disclosure, identification information for identifying the wireless power transmitter 500 may be transmitted in various forms through a power signal (for example, a long beacon signal) for driving the wireless power receiver 550. Thereafter, the wireless power receiver 550 may transmit a search frame for searching for a nearby power transmitter or a join request frame for requesting joining in a wireless power network controlled by the wireless power transmitter 500. When the wireless power receiver 550 performs such a series of operations, the controller 22 of the power transmitter 500 may determine effectiveness of the wireless power receiver 550 based on the identification information of the wireless power transmitter 500 included in a signal (for example, an AD signal) notified by the wireless power receiver 121.

The controller 22 may transmit the identification information of the wireless power transmitter 500 through a power signal transmitted to identify an effective wireless power receiver.

The controller 22 provides a voltage value to the power supply unit 20 to control a transmission power amount or power signal, and controls on/off of the gate driver 10. Herein, changing a transmission power amount may be understood as changing the voltage $V_{DD}$ output from the power supply unit 20 by adjusting a voltage value provided to the power supply unit 20 by the controller 22, as well as changing the current $I_{DD}$ or the current $I_{TX}$ of the resonance signal in the resonance signal generator 16.

The controller 22 may control the power output from the PA 12 by controlling a duty and a level of the gate driver 10 that are input to the PA 12. When an AC current input to the resonance signal generator 16 is changed, the strength of a magnetic field is also changed, such that adjustment of the output power may be achieved by controlling the strength of the magnetic field. That is, as the strength of the magnetic field in the wireless power transmitter 500 is changed, received power, i.e., a measured voltage $V_{RECT}$ or a measured current $V_{RECT}$, is changed in the wireless power receiver 550.

With such a change in the transmission power amount, the voltage $V_{RECT}$ measured at the rear end of the rectifier 116 of the wireless power receiver 550 may also be changed. Thus, cross connection of the wireless power receiver 550 may be determined based on the change in the transmitted power and the change in the voltage $V_{RECT}$ measured at the rear end of the rectifier 116.

If the wireless power receiver 550 has transmitted an initial reference voltage and an initial reference current, the controller 22 may adjust a transmission power amount to correspond to the wireless power receiver 550. That is, by using the initial reference voltage and the initial reference current, the controller 22 may accurately determine by how much a transmission power amount should be reduced or increased for a power amount that may be received by the wireless power receiver 550.

Herein, the initial reference voltage and the initial reference current are reference values that are set by the controller 22 for a voltage and a current to be supplied to the power supply unit 20 and are provided to the power supply unit 20, so that the voltage $V_{DD}$ to be output from the power supply unit 20 may be adjusted. The initial reference voltage and the initial reference current may be transmitted through a frame transmitted from the wireless power receiver 550 to the wireless power transmitter 500 through the wireless communication unit 120, and a type of the frame may be any type as far as the frame may be transmitted to the wireless power transmitter 500.

The wireless power transmitter 500 includes the wireless communication unit 24, which may be configured to use one of various wireless short-range communication schemes, e.g., Bluetooth or Zigbee, to communicate with the wireless communication unit 120 of the wireless power receiver 550 in association with a wireless power transmission operation under control of the controller 22. Herein, the resonance signal generator 16 may include a charging board for placing the wireless power receiver 550 on or above the resonance signal generator 16.

The controller 22 of the wireless power transmitter 500 may include an MCU.

The wireless power receiver 550 includes a resonance signal receiving unit (or resonator) 112 for receiving a wireless resonance signal transmitted from the resonance signal generator 16 of the wireless power transmitter 500, the rectifier 116 for rectifying the power in an AC form to DC power, upon receipt of a signal in the AC form, received through the resonance signal receiving unit 112, through a matching circuit 114, a DC/DC converter (or a static voltage generator) 118 for converting the power output from the rectifier 116 into operating power (for example, +5V) desired by a portable terminal to which the wireless power receiver 550 is applied, a charging unit/Power Management Integrated Circuit (PMIC) 124, and a controller 122 for measuring an input voltage $V_{IN}$ input to the DC/DC converter 118 and an output voltage $V_{OUT}$ and an output current $T_{OUT}$ from the DC/DC converter 118.

The controller 122, which may include an MCU, determines a power reception state based on the measured voltage $V_{RECT}$/current $I_{RECT}$, and provides information about the power reception state to the wireless power transmitter 500.

To communicate with the wireless power transmitter 500 in association with a wireless power reception operation under control of the controller 122, the wireless power receiver 550 includes the wireless communication unit 120 configured using one of various wireless short-range communication schemes.

Figure 4:
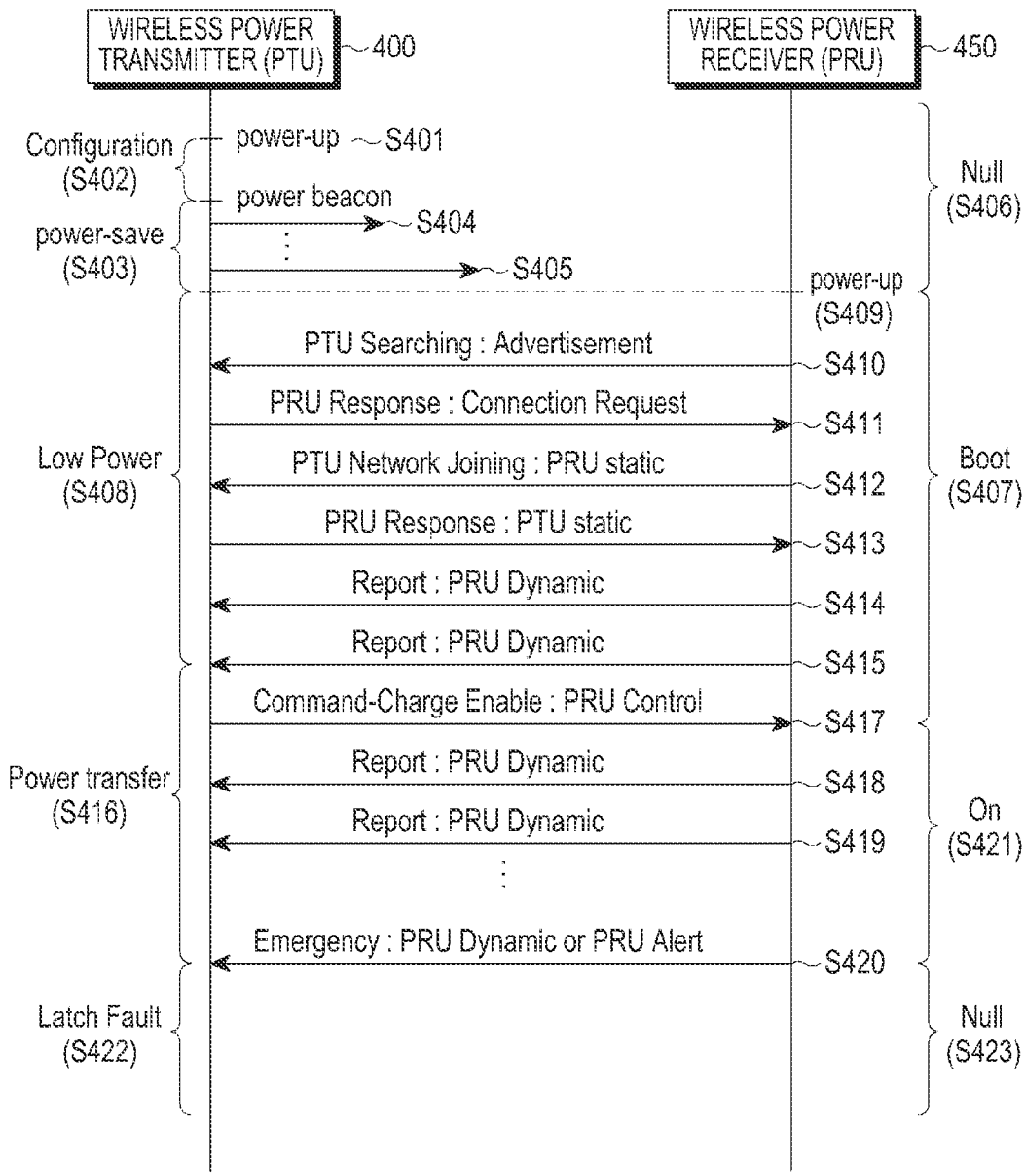
FIG. 4 is a signal flow diagram illustrating operations of a wireless power transmitter and a wireless power receiver according to an embodiment of the present disclosure.

FIG. 4 is a signal flow diagram illustrating operations of a wireless power transmitter and a wireless power receiver according to an embodiment of the present disclosure.

Referring to FIG. 4, a wireless power transmitter 400 is powered on in step S401.

In step S402, the wireless power transmitter 400 configures an environment.

In step S403, the wireless power transmitter 400 enters a power save mode. In the power save mode, the wireless power transmitter 400 may apply different types of power beacons for detection, with their respective periods.

For example, the wireless power transmitter 400 transmits power beacons 404 and 405 for detection (short beacons or long beacons) and the power beacons 404 and 405 may have different power values. One or both of the power beacons 404 and 405 for detection may have power enough to drive the communication unit of a wireless power receiver 450. The wireless power receiver 450 may communicate with the wireless power transmitter 400 by driving its communication unit using one or both of the power beacons 404 and 405. This state may be referred to as a null state in step S406.

The wireless power transmitter 400 may detect a load variation caused by disposition of the wireless power receiver 450.

The wireless power transmitter 400 enters a low power mode in step S408.

The wireless power receiver 450 enters a boot state in step S407.

In the boot state, the wireless power receiver 450 drives the communication unit with power received from the wireless power transmitter 400 in step S409.

In step S410, the wireless power receiver 450 transmits a PTU searching signal to the wireless power transmitter 400. For example, the wireless power receiver 450 may transmit the PTU searching signal using a BLE-based AD signal and may continue to transmit the PTU searching signal periodically, until it receives a response signal from the wireless power transmitter 400 or a predetermined time period elapses.

According to an embodiment of the present disclosure, the wireless power receiver 450 detects identification information of the wireless power transmitter 400, which is included in a beacon signal transmitted from the wireless power transmitter 400, and transmits the detected identification information through the AD signal.

Upon receipt of the PTU searching signal from the wireless power receiver 450, the wireless power transmitter 400 transmits a PRU response signal in step S411. The PRU response signal may establish a connection between the wireless power transmitter 400 and the wireless power receiver 450.

In step S412, the wireless power receiver 450 transmits a PRU static signal. The PRU static signal may indicate a state of the wireless power receiver 450 and may request joining a wireless power network managed by the wireless power transmitter 400.

In step S413, the wireless power transmitter 400 transmits a PTU static signal, which may indicate capabilities of the wireless power transmitter 400.

In steps S414 and S415, the wireless power receiver 450 periodically transmits a PRU dynamic signal. The PRU dynamic signal may include at least one parameter measured by the wireless power receiver 450. For example, the PRU dynamic signal may include information about a voltage at the output end of a rectifier of the wireless power receiver 450.

In step S416, the wireless power transmitter 400 enters a power transfer mode, in which the wireless power transmitter 400 may transmit charging power.

In step S417, the wireless power transmitter 400 transmits a PRU control signal commanding charging to the wireless power receiver 450.

The PRU control signal transmitted by the wireless power transmitter 400 may include information that enables/disables charging of the wireless power receiver 450 and permission information. The PRU control signal may be transmitted each time a charged state is changed. For example, the PRU control signal may be transmitted every 250 ms or upon occurrence of a parameter change. The PRU control signal may also be configured to be transmitted within a predetermined threshold time, for example, within 1 second, even though any parameter is not changed.

In step S421, the wireless power receiver 450 operates in an ON state.

In the ON state, in steps S418 and S419, the wireless power receiver 450 changes a setting according to the PRU control signal and transmits a PRU dynamic signal to report a state of the wireless power receiver 450. The PRU dynamic signal transmitted by the wireless power receiver 450 may include information about at least one of a voltage, a current, a wireless power receiver state, and a temperature.

The PRU dynamic signal may have a data structure as illustrated in Table 1.

TABLE 1

| Field | Octets | Description | Use | Units |
|---|---|---|---|---|
| Optional fields | 1 | Defines which optional fields are populated | Mandatory | |
| $V_{RECT}$ | 2 | Voltage at diode output | Mandatory | mV |
| $I_{RECT}$ | 2 | Current at diode output | Mandatory | mA |
| $V_{OUT}$ | 2 | Voltage at charge/ battery port | Optional | mV |
| $I_{OUT}$ | 2 | Current at charge/ battery port | Optional | mA |
| Temperature | 1 | Temperature of PRU | Optional | Deg C. from −40 C. |
| $V_{RECT\_MIN\_DYN}$ | 2 | $V_{RECT\_LOW\_LIMIT}$ (dynamic value) | Optional | mV |
| $V_{RECT\_SET\_DYN}$ | 2 | Desired $V_{RECT}$ (dynamic value) | Optional | mV |
| $V_{RECT\_HIGH\_DYN}$ | 2 | $V_{RECT\_HIGH\_LIMIT}$ (dynamic value) | Optional | mV |
| PRU alert | 1 | Warnings | Mandatory | Bit field |
| RFU | 3 | Undefined | | |

Referring to Table 1, the PRU dynamic signal includes multiple fields that provide optional field information, information about a voltage at the output end of the rectifier of the wireless power receiver, information about a current at the output end of the rectifier of the wireless power receiver, information about a voltage at the output end of the DC/DC converter of the wireless power receiver, information about a current at the output end of the DC/DC converter of the wireless power receiver, temperature information, information about a minimum voltage value $V_{RECT\_MIN\_DYN}$ at the output end of the rectifier of the wireless power receiver, information about an optimum voltage value $V_{RECT\_SET\_DYN}$ at the output end of the rectifier of the wireless power receiver, information about a maximum voltage value $V_{RECT\_HIGH\_DYN}$ at the output end of the rectifier of the wireless power receiver, and warning information. For example, the PRU dynamic signals illustrated in FIG. 4 may include at least one of the above-identified fields.

For example, at least one voltage set value that has been determined according to a charging situation may be transmitted in the at least one field of the PRU dynamic signal.

Upon receipt of the PRU dynamic signal, the wireless power transmitter may adjust a wireless charging voltage to be transmitted to each wireless power receiver based on the voltage value set in the PRU dynamic signal.

Among the fields, a PRU Alert may be configured in the data structure as illustrated in Table 2.

TABLE 2

| 7 | 6 | 5 | 4 | 3 | 2 | 1 | 0 |
|---|---|---|---|---|---|---|---|
| Over voltage | Over current | Over temp | Charge complete | TA detect | Transition | restart request | RFU |

Referring to Table 2, the PRU Alert includes a bit for restart request, a bit for transition, and a bit for Travel Adapter (TA) detect. The TA detect bit indicates that a wireless power receiver has been connected to a wired charging terminal in the wireless power transmitter that provides wireless charging. The Transition bit indicates to the wireless power transmitter that a communication Integrated Circuit (IC) of the wireless power receiver is reset before the wireless power receiver transitions from the SA mode to the NSA mode. Further, the restart request bit indicates that the wireless power transmitter is ready to resume charging of the wireless power receiver, when the wireless power transmitter that has discontinued charging by reducing transmission power due to overcurrent or overtemperature returns to a normal state.

The PRU Alert may also be configured in the data structure as illustrated in Table 3.

TABLE 3

| 7 | 6 | 5 | 4 | 3 | 2 | 1 | 0 |
|---|---|---|---|---|---|---|---|
| PRU over-voltage | PRU over-current | PRU over-temperature | PRU Self Protection | Charge Complete | Wired Charger Detect | Mode Transition Bit 1 | Mode Transition Bit 0 |

Referring to Table 3, the PRU Alert may include the fields of overvoltage, overtemperature, PRU Self Protection, Charge Complete, Wired Charger Detect, and Mode Transition. If the overvoltage field is set to '1', this may imply that the voltage Vrect of the wireless power receiver has exceeded an overvoltage limit. The overcurrent and overtemperature fields may be set in the same manner as the overvoltage field. PRU Self Protection indicates that the wireless power receiver protects itself by directly reducing power affecting a load. In this case, the wireless power transmitter does not need to change a charged state.

According to an embodiment of the present disclosure, bits for Mode Transition may be set to a value indicating the duration of a mode transition to the wireless power transmitter. For example, the Mode Transition bits may be configured as illustrated in Table 4.

TABLE 4

| Value(Bit) | Mode Transition Bit Description |
|---|---|
| 00 | No Mode Transition |
| 01 | 2 s Mode Transition time limit |
| 10 | 3 s Mode Transition time limit |
| 11 | 6 s Mode Transition time limit |

Referring to Table 4, if the Mode Transition bits are set to '00', this indicates no mode transition. If the Mode Transition bits are set to '01', this indicates that a time limit for completion of a mode transition is 2 seconds. If the Mode Transition bits are set to '10', this indicates that the time limit for completion of a mode transition is 3 seconds. If the Mode Transition bits are set to '11', this indicates that the time limit for completion of a mode transition is 6 seconds.

For example, if a mode transition takes 3 seconds or less, the Mode Transition bits may be set to '10'.

Before starting a mode transition, the wireless power receiver may make sure that no impedance shift will occur during the mode transition by changing an input impedance setting to match a 1.1-W power draw. Accordingly, the wireless power transmitter adjusts power $I_{TX\_COIL}$ for the wireless power receiver according to this setting, and thus, may maintain the power $I_{TX\_COIL}$ for the wireless power receiver during the mode transition.

After a mode transition duration is set by the Mode Transition bits, the wireless power transmitter may maintain the power $I_{TX\_COIL}$ for the wireless power receiver during the mode transition duration, e.g., for 3 seconds. Even though the wireless power transmitter does not receive a response from the wireless power receiver for 3 seconds, the wireless power transmitter may maintain a connection to the wireless power receiver. However, after the mode transition duration elapses, the wireless power transmitter may end the power transmission, considering that the wireless power receiver is a rogue object.

Referring again to FIG. 4, the wireless power receiver 450 may sense generation of an error.

In step S420, the wireless power receiver 450 may transmit a warning signal to the wireless power transmitter 400. The warning signal may be transmitted by a PRU dynamic signal or an alert signal. For example, the wireless power receiver 450 may transmit the PRU Alert field, as illustrated in Table 1, to indicate an error state to the wireless power transmitter 400. Alternatively, the wireless power receiver 450 may transmit a stand-alone warning signal indicating an error state to the wireless power transmitter 400.

Upon receipt of the warning signal, the wireless power transmitter 400 may enter a latch fault mode in step S422. Further, the wireless power receiver 450 may enter a null state in step S423.

Figure 5:
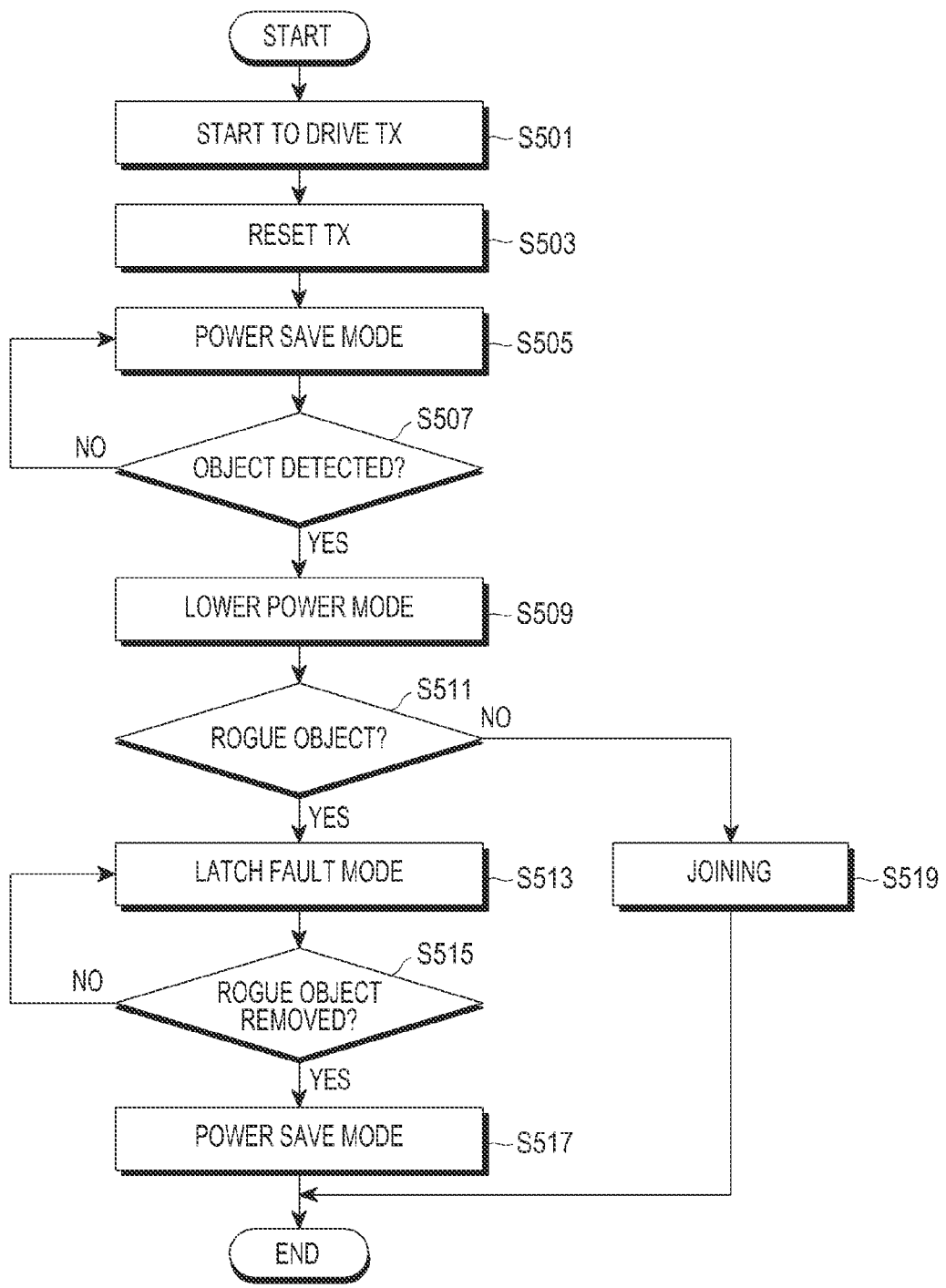
FIG. 5 is a flowchart illustrating an operation of a wireless power transmitter according to an embodiment of the present disclosure.

FIG. 5 is a flowchart illustrating an operation of a wireless power transmitter according to an embodiment of the present disclosure. The operation of FIG. 5 will be described in detail with reference to FIG. 6.

Figure 6:
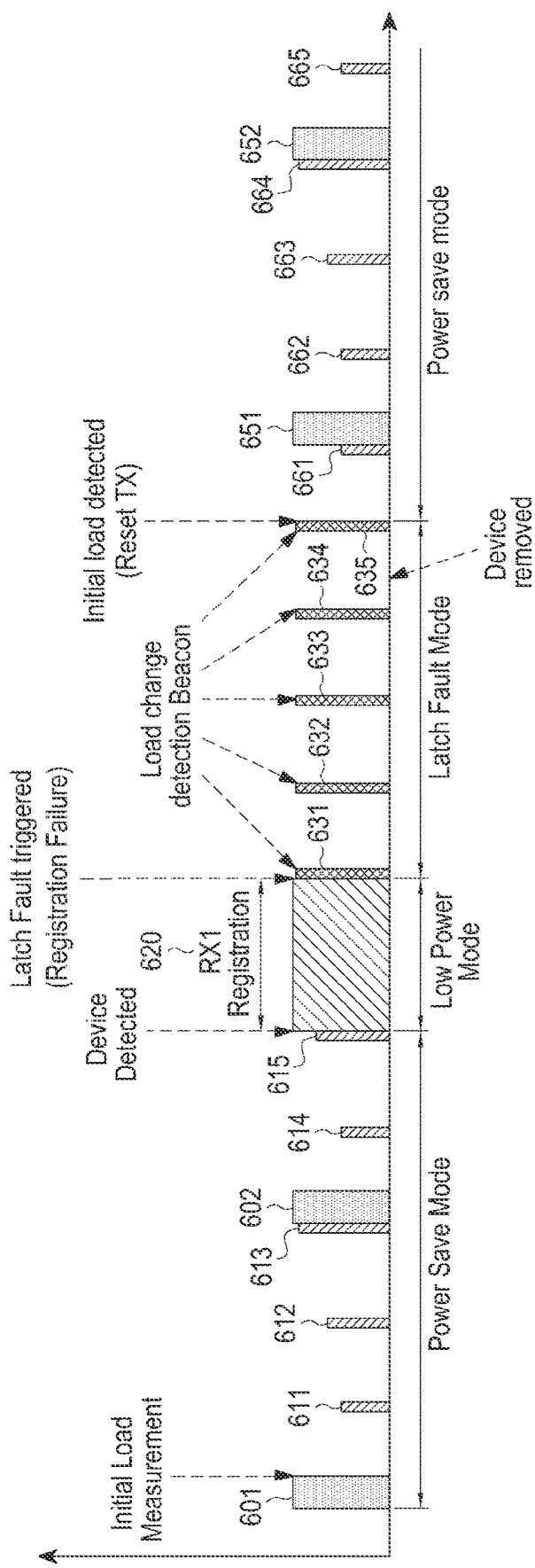
FIG. 6 is a graph illustrating power applied by a wireless power transmitter with respect to a time axis according to an embodiment of the present disclosure.

FIG. 6 is a graph illustrating power applied by a wireless power transmitter with respect to a time axis according to an embodiment of the present disclosure.

Referring to FIG. 5, the wireless power transmitter starts to operate in step S501.

In step S503, the wireless power transmitter resets an initial setting, and in step S505, enters the power save mode. The wireless power transmitter may apply different types of power, having different power amounts, to a power transmitter in the power save mode.

For example, referring to FIG. 6, the wireless power transmitter applies second detection power 601 and 602 and third detection power 611 to 615 to the power transmitter. The wireless power transmitter applies the second detection power 601 and 602 periodically within a second period.

When the wireless power transmitter supplies the second detection power 601 and 602, the second detection power 601 and 602 may last for a second time duration.

The wireless power transmitter may apply the third detection power 611 to 615 periodically within a third period.

When the wireless power transmitter supplies the third detection power 611 to 615, the third detection power 611 to 615 may last for a third time duration.

The third detection power 611 to 615 may have the same power value, or different power values as illustrated in FIG. 6.

After outputting the third detection power 611, the wireless power transmitter may output the third detection power 612 having the same power amount. The third detection power may have a power amount enough to detect the smallest wireless power receiver, for example, a wireless power receiver of category 1.

Alternatively, after outputting the third detection power 611, the wireless power transmitter may output the third detection power 612 having a different power amount. If the wireless power transmitter outputs different amounts of third detection power as described above, the respective power amounts of the third detection power may be sufficient to detect wireless power receivers of category 1 to category 5. For example, the third detection power 611 may have a power amount sufficient to detect a wireless power receiver of category 5, the third detection power 612 may have a power amount sufficient to detect a wireless power receiver of category 3, and the third detection power 613 may have a power amount sufficient to detect a wireless power receiver of category 1.

The second detection power 601 and 602 may drive the wireless power receiver. More specifically, the second detection power 601 and 602 may have a power amount sufficient to drive the controller and/or the communication unit of the wireless power receiver.

The wireless power transmitter may apply the second detection power 601 and 602 and the third detection power 611 to 615, respectively, with the second and third periods to the wireless power receiver. If the wireless power receiver is placed on the wireless power transmitter, impedance, viewed from a point of the wireless power transmitter, may be changed. The wireless power transmitter may then detect an impedance shift during application of the second detection power 601 and 602 and the third detection power 611 to 615. For example, the wireless power transmitter may detect an impedance shift during application of the third detection power 615.

Referring again to FIG. 5, the wireless power transmitter may detect an object in step S507. If no object is detected in step S507, the wireless power transmitter remains in the power save mode, in which it applies different types of power periodically in step S505.

However, if the wireless power transmitter detects an object due to an impedance shift in step S507, the wireless power transmitter enters the low power mode in step S509. In the low power mode, the wireless power transmitter applies a driving power having a power amount sufficient to drive the controller and the communication unit of the wireless power receiver.

For example, referring again to FIG. 6, the wireless power transmitter may apply driving power 620 to the power transmitter. The wireless power receiver may receive the driving power 620 and drive the controller and/or the communication unit with the driving power 620. The wireless power receiver may communicate with the wireless power transmitter with the driving power 620 in a predetermined communication scheme.

For example, the wireless power receiver may transmit and receive data for authentication and may join a wireless power network managed by the wireless power transmitter based on the data. However, if a rogue object is placed on the wireless power transmitter, instead of a wireless power receiver, data transmission and reception may not be performed.

Referring again to FIG. 5, the wireless power transmitter determines whether the object is a rogue object in step S511. For example, if the wireless power transmitter fails to receive a response from the object for a predetermined time, the wireless power transmitter may determine the object to be a rogue object.

If the wireless power transmitter determines the object to be a rogue object in step S511, the wireless power transmitter enters the latch fault mode in step S513. However, if the wireless power transmitter determines that the object is not a rogue object in step S511, the wireless power transmitter performs a joining operation in step S519.

For example, referring again to FIG. 6, the wireless power transmitter may apply first power 631 to 634 periodically with a first period. The wireless power transmitter may detect an impedance shift during application of the first power.

Referring again to FIG. 5, if the rogue object is removed in step S515, the wireless power transmitter detects an impedance shift, and thus, determines that the rogue object has been removed. However, if the rogue object is not removed in step S515, the wireless power transmitter will not detect an impedance shift, and thus, determines that the rogue object has not been removed. If the rogue object has not been removed, the wireless power transmitter may notify a user that the wireless power transmitter is currently in an error state by performing at least one of illuminating a lamp or outputting a warning sound. Accordingly, the wireless power transmitter may include an output unit for illuminating a lamp and/or outputting a warning sound.

When determining that the rogue object has not been removed in step S515, the wireless power transmitter maintains the latch fault mode in step S513. However, if the rogue object has been removed in step S515, the wireless power transmitter may reenter the power save mode in step S517.

For example, referring again to FIG. 6, the wireless power transmitter may apply second power 651 and 652 and third power 661 to 665.

As described above, if a rogue object is placed on the wireless power transmitter, instead of a wireless power receiver, the wireless power transmitter may enter the latch fault mode. Further, the wireless power transmitter may then determine whether the rogue object has been removed based on an impedance shift that occurs according to power applied in the latch fault mode. That is, a condition of entry to the latch fault mode may be the presence of a rogue object as illustrated in FIGS. 5 and 6.

Additionally, the wireless power transmitter may have many other conditions for entry to the latch fault mode. For example, the wireless power transmitter may be cross connected to a mounted wireless power receiver. In this case, the wireless power transmitter may also enter the latch fault mode.

When the wireless power transmitter is cross connected to a wireless power receiver, the wireless power transmitter should return to an initial state and the wireless power receiver should be removed. The wireless power transmitter may set cross connection of a wireless power receiver placed on another wireless power transmitter, i.e., joining of a wireless power receiver placed on another wireless power transmitter in a wireless power network managed by the wireless power transmitter as a condition for entry to the latch fault mode.

Figure 7:
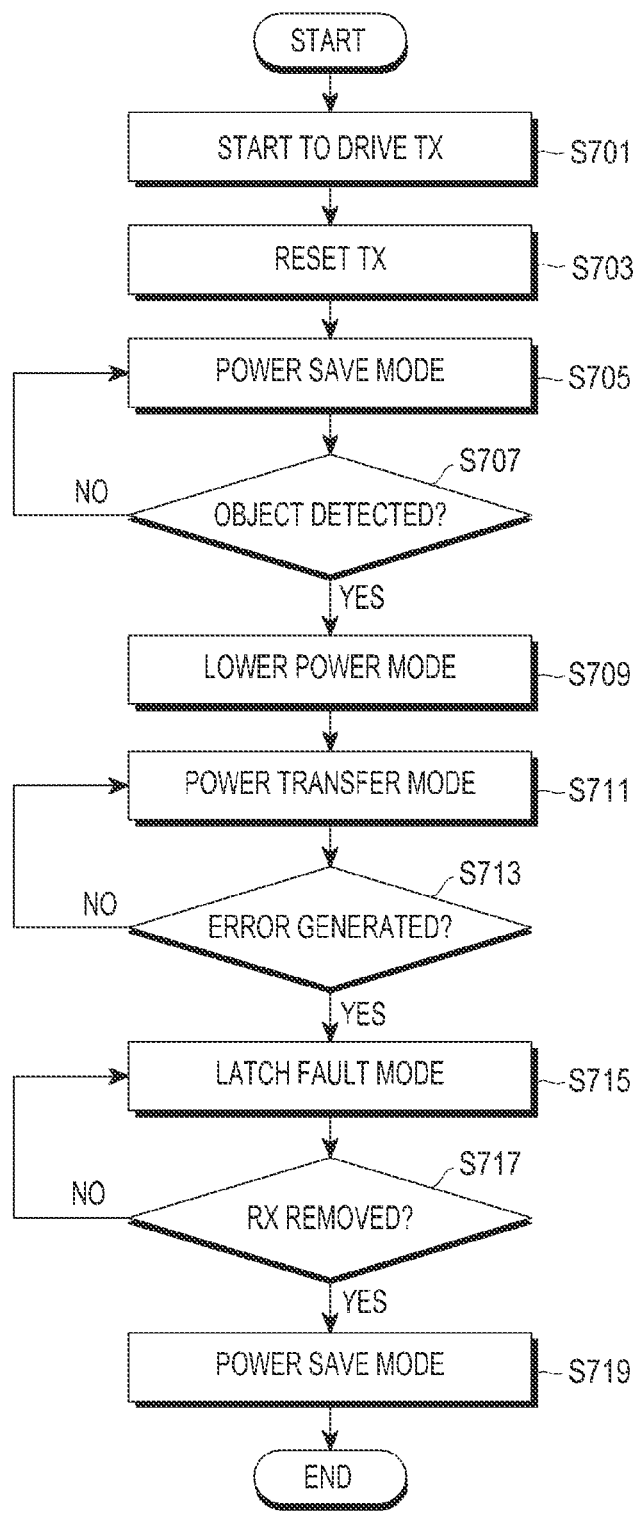
FIG. 7 is a flowchart illustrating a method for controlling a wireless power transmitter according to an embodiment of the present disclosure.

FIG. 7 is a flowchart illustrating a method for controlling a wireless power transmitter according to an embodiment of the present disclosure. The method of FIG. 7 will be described in detail with reference to FIG. 8.

Figure 8:
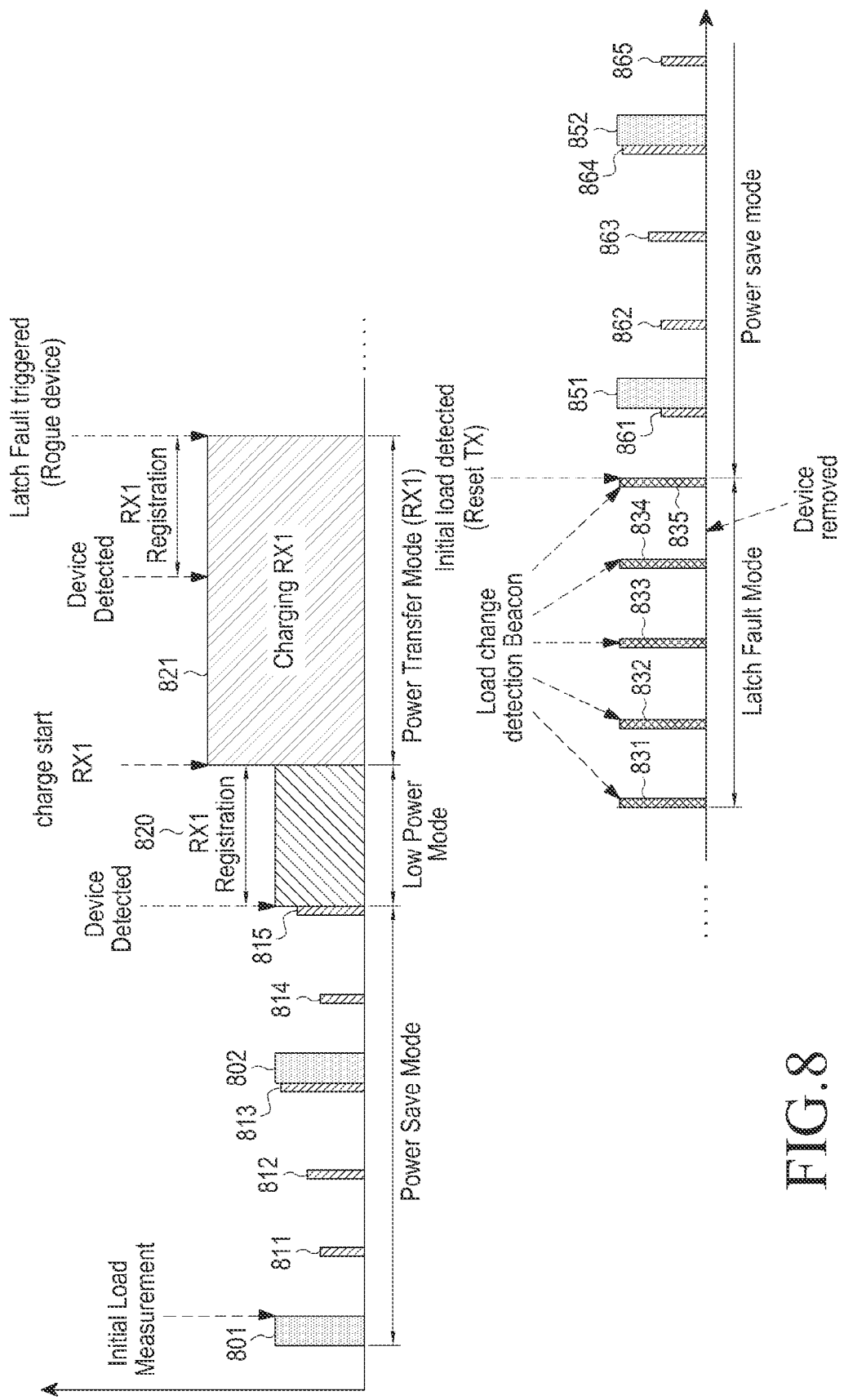
FIG. 8 is a graph illustrating power applied by a wireless power transmitter with respect to a time axis according to an embodiment of the present disclosure.

FIG. 8 is a graph illustrating power applied by a wireless power transmitter with respect to a time axis according to an embodiment of the present disclosure.

Referring to FIG. 7, the wireless power transmitter starts to operate in step S701.

In step S703, the wireless power transmitter resets an initial setting, and in step S705, enters the power save mode. The wireless power transmitter may apply different types of power having different power amounts to the power transmitter in the power save mode.

For example, referring to FIG. 8, the wireless power transmitter may apply second detection power 801 and 802 and third detection power 811 to 815 to the power transmitter. The wireless power transmitter may apply the second detection power 801 and 802 periodically with a second period.

When the wireless power transmitter applies the second detection power 801 and 802, the second detection power 801 and 802 may last for a second time duration.

The wireless power transmitter may apply the third detection power 811 to 815 periodically with a third period.

When the wireless power transmitter applies the third detection power 811 to 815, the third detection power 811 to 815 may last for a third time duration. The third detection power 811 to 815 may have the same power value, or different power values as illustrated in FIG. 8.

The second detection power 801 and 802 may drive the wireless power receiver. More specifically, the second detection power 801 and 802 may have a power amount sufficient to drive the controller and/or the communication unit of the wireless power receiver.

The wireless power transmitter may apply the second detection power 801 and 802 and the third detection power 811 to 815, respectively, with the second and third periods to the wireless power receiver.

If the wireless power receiver is placed on the wireless power transmitter, impedance viewed from a point of the wireless power transmitter may change. The wireless power transmitter may then detect an impedance shift during application of the second detection power 801 and 802 and the third detection power 811 to 815.

For example, the wireless power transmitter may detect an impedance shift during application of the third detection power 815.

Referring again to FIG. 7, the wireless power transmitter may detect an object in step S707. If no object is detected in step S707, the wireless power transmitter remains in the power save mode in which it applies different types of power periodically in step S705.

If the wireless power transmitter detects an object due to an impedance shift in step S707, the wireless power transmitter enters the low power mode in step S709. In the low power mode, the wireless power transmitter applies a driving power having a power amount sufficient to drive the controller and/or the communication unit of the wireless power receiver.

For example, referring again to FIG. 8, the wireless power transmitter may apply driving power 820 to the power transmitter. The wireless power receiver may receive the driving power 820 and drive the controller and/or the communication unit with the driving power 820. The wireless power receiver may communicate with the wireless power transmitter with the driving power 820 in a predetermined communication scheme.

For example, the wireless power receiver may transmit and receive data required for authentication and join a wireless power network managed by the wireless power transmitter based on the data.

Referring again to FIG. 7, the wireless power transmitter enters the power transfer mode in which it transmits charging power in step S711.

For example, referring again to FIG. 8, the wireless power transmitter may apply charging power 821 and the charging power 821 may be transmitted to the wireless power receivers.

In the power transfer mode, the wireless power transmitter may determine whether an error has occurred. The error may be the presence of a rogue object, a cross connection, an overvoltage, an overcurrent, or an overtemperature. The wireless power transmitter may include a sensing unit for measuring overvoltage, overcurrent, or overtemperature.

For example, the wireless power transmitter may measure a voltage or current at a reference point and determine that a measured voltage or current exceeding a threshold satisfies an overvoltage or overcurrent condition.

Alternatively, the wireless power transmitter may include a temperature sensor that measures a temperature at a reference point of the wireless power transmitter. If the temperature at the reference point exceeds a threshold, the wireless power transmitter may determine that an overtemperature condition is satisfied.

If the wireless power transmitter determines an overvoltage, an overcurrent, or an overtemperature state according to a measured voltage, current, or temperature value, the wireless power transmitter prevents the overvoltage, the overcurrent, or the overtemperature by decreasing wireless charging power by a predetermined value.

If the voltage value of the decreased wireless charging power is below a set minimum value (for example, the minimum voltage value VRECT_MIN_DYN at the output end of the rectifier of the wireless power receiver), wireless charging is discontinued, and thus, a voltage set value may be re-adjusted.

While the presence of a rogue object on the wireless power transmitter is shown as an error in the embodiment illustrated in FIG. 8, the error is not limited to the presence of a rogue object. Thus, it will be readily understood to those skilled in the art that the wireless power transmitter may operate in a similar manner regarding the presence of a rogue object, a cross connection, an overvoltage, an overcurrent, and an overtemperature.

Referring again to FIG. 7, if no error occurs in step S713, the wireless power transmitter remains in the power transfer mode in step S711. However, if an error occurs in step S713, the wireless power transmitter enters the latch fault mode in step S715.

For example, referring again to FIG. 8, the wireless power transmitter may apply first power 831 to 835. Further, the wireless power transmitter may output an error notification including at least one of lamp illumination or a warning sound during the latch fault mode.

Referring again to FIG. 7, if it is determined that the rogue object or the wireless power receiver has not been removed in step S717, the wireless power transmitter maintains the latch fault mode in step S715. However, if it is determined that the rogue object or the wireless power receiver has been removed in step S717, the wireless power transmitter reenters the power save mode in step S719.

For example, referring again to FIG. 8, the wireless power transmitter may apply second power 851 and 852 and third power 861 to 865.

Figure 9:
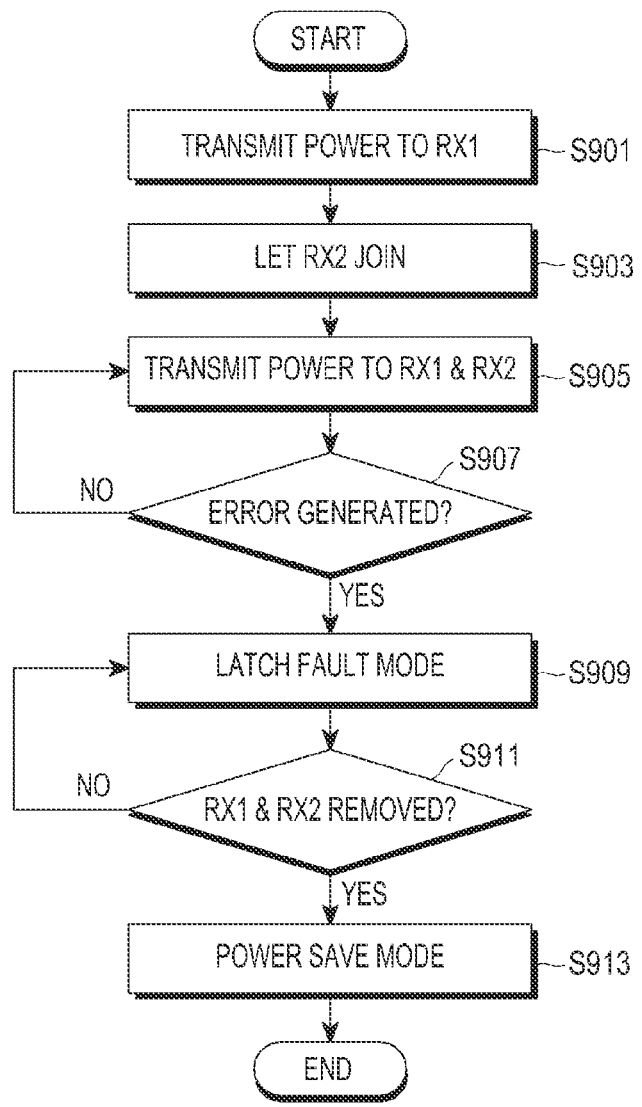
FIG. 9 is a flowchart illustrating a method for controlling a wireless power transmitter according to an embodiment of the present disclosure.

FIG. 9 is a flowchart illustrating a method for controlling a wireless power transmitter according to an embodiment of the present disclosure. Specifically, the method of FIG. 9 will be described in detail with reference to FIG. 9.

Figure 10:
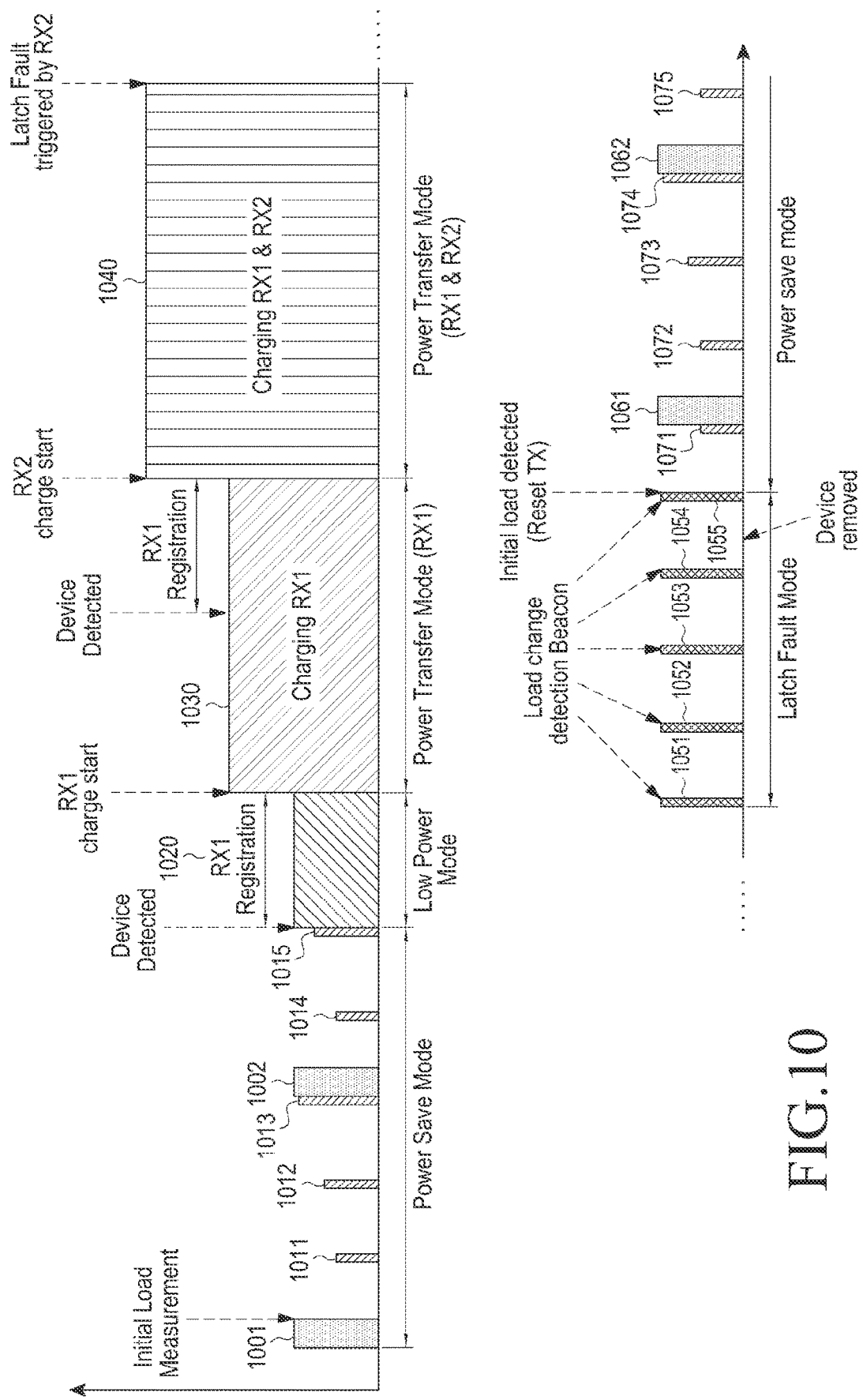
FIG. 10 is a graph illustrating power supplied by a wireless power transmitter with respect to a time axis according to an embodiment of the present disclosure.

FIG. 10 is a graph illustrating power supplied by a wireless power transmitter with respect to a time axis according to an embodiment of the present disclosure.

Referring to FIG. 9, the wireless power transmitter transmits charging power to a first wireless power receiver in step S901.

In step S903, the wireless power transmitter joins a second wireless power receiver to the network.

In step S905, the wireless power transmitter transmits charging power to first wireless power receiver and the second wireless power receiver. More specifically, the wireless power transmitter may apply the sum of charging power required for the first wireless power receiver and charging power required for the second wireless power receiver to power receivers of the first and second wireless power receivers.

For example, referring to FIG. 10, the wireless power transmitter may maintain the power save mode in which the wireless power applies second detection power 1001 and 1002 and third detection power 1011 to 1015. Subsequently, the wireless power transmitter may detect the first wireless power receiver and enter the low power mode in which the wireless power transmitter maintains detection power 1020. Thereafter, the wireless power transmitter may enter the power transfer mode in which the wireless power transmitter applies first charging power 1030. The wireless power transmitter may detect the second wireless power receiver and may allow the second wireless power receiver to join the wireless power network. In addition, the wireless power transmitter may apply second charging power 1040 being the sum of charging power required for the first wireless power receiver and charging power required for the second wireless power receiver.

Referring again to FIG. 9, while transmitting charging power to both the first and second wireless power receivers, the wireless power transmitter may detect an error in step S907. As described before, the error may be the presence of a rogue object, a cross connection, an overvoltage, an overcurrent, or an overtemperature.

If no error occurs in step S907, the wireless power transmitter continues to transmit the charging power to both the first and second wireless power receivers in step S905.

However, if an error occurs in step S907, the wireless power transmitter enters the latch fault mode in step S909.

For example, referring again to FIG. 10, the wireless power transmitter may apply first power 1051 to 1055 with a first period.

Referring again to FIG. 9, the wireless power transmitter determines whether both the first and second wireless power receivers have been removed in step S911.

For example, referring again to FIG. 10, the wireless power transmitter may detect an impedance shift while applying the first power 1051 to 1055. The wireless power transmitter may determine whether both the first and second wireless power receivers have been removed by checking whether impedance has returned to an initial value.

Referring again to FIG. 9, if determining that both the first and second wireless power receivers have been removed in step S911, the wireless power transmitter enters the power save mode in step S913.

For example, referring again to FIG. 10, the wireless power transmitter may apply second detection power 1061 and 1062 and third detection power 1071 to 1075 respectively with second and third periods.

As described above, even though the wireless power transmitter applies charging power to a plurality of wireless power receivers, upon occurrence of an error, the wireless power transmitter may readily determine whether a wireless power receiver or a rogue object has been removed.

Figure 11:
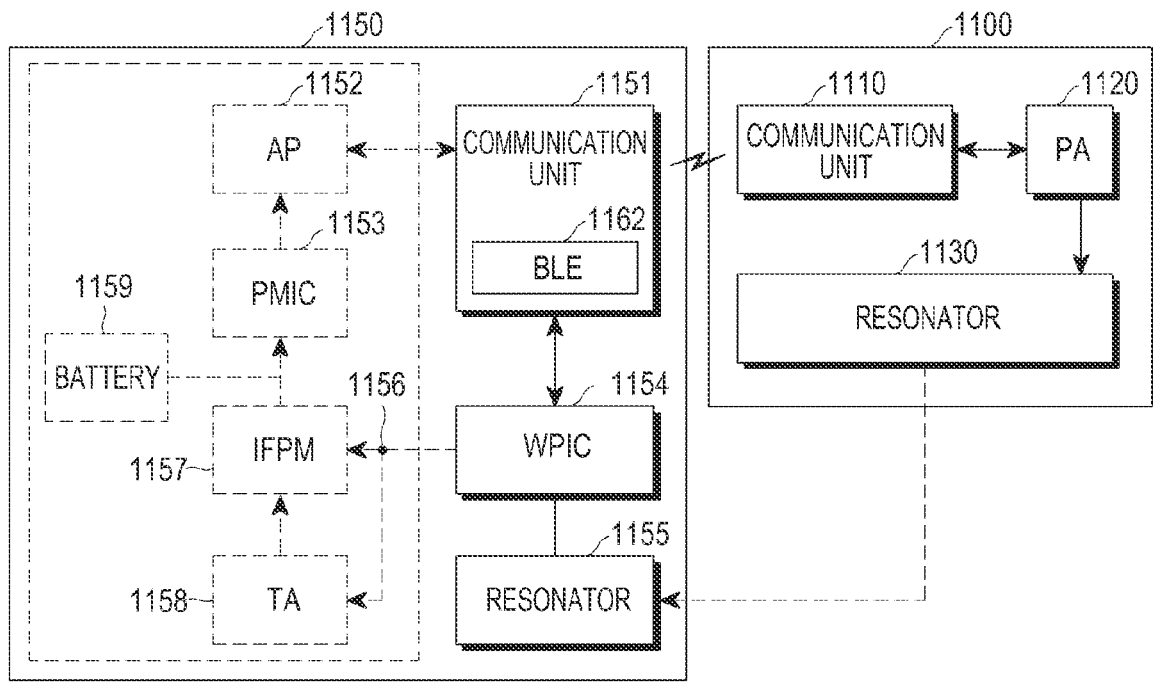
FIG. 11 illustrates a wireless power transmitter and a wireless power receiver in a Stand Alone (SA) mode according to an embodiment of the present disclosure.

FIG. 11 illustrates a wireless power transmitter and a wireless power receiver in an SA mode according to an embodiment of the present disclosure.

Referring to FIG. 11, a wireless power transmitter 1100 includes a communication unit 1110, a PA 1120, and a resonator 1130. A wireless power receiver 1150 includes a communication unit 1151, an Application Processor (AP) 1152, a Power Management Integrated Circuit (PMIC) 1153, a Wireless Power Integrated Circuit (WPIC) 1154, a resonator 1155, an Interface Power Management IC (IFPM) 1157, a TA 1158, and a battery 1159.

The communication unit 1110 of the wireless power transmitter 1100 may be configured as a WiFi/BT combo IC that communicates with the communication unit 1151 the wireless power receiver 1150 in a predetermined communication scheme, e.g., in BLE. For example, the communication unit 1151 of the wireless power receiver 1150 may transmit a PRU dynamic signal, e.g., having the data structure as illustrated in Table 1, to the communication unit 1110 of the wireless power transmitter 1100. As described above, the PRU dynamic signal may include at least one of voltage information, current information, and temperature information about the wireless power receiver 1150.

An output power value from the PA 1120 may be adjusted based on the received PRU dynamic signal. For example, if an overvoltage, an overcurrent, or an overtemperature is applied to the wireless power receiver 1150, a power value output from the PA 1120 may be decreased. If the voltage or current of the wireless power receiver 1150 is below a predetermined value, the power value output from the PA 1120 may be increased.

Charging power from the resonator 1130 of the wireless power transmitter 1100 is transmitted wirelessly to the resonator 1155 of the wireless power receiver 1150.

The WPIC 1154 rectifies the charging power received from the resonator 1155 and performs DC/DC conversion on the rectified charging power. The WPIC 1154 may drive the communication unit 1151 or charge the battery 1159 with the converted power.

A wired charging terminal may be inserted into the TA 1158. A wired charging terminal such as a 30-pin connector or a Universal Serial Bus (USB) connector may be inserted into the TA 1158. The TA 1158 may receive power from an external power source and charge the battery 1159 with the received power.

The IFPM 1157 processes the power received from the wired charging terminal and outputs the processed power to the battery 1159 and the PMIC 1153.

The PMIC 1153 manages power received (wirelessly or by wire) and power applied to each component of the wireless power receiver 1150. The AP 1152 may receive power information from the PMIC 1153 and control the communication unit 1151 to transmit a PRU dynamic signal for reporting the power information.

A node 1156 connected to the WPIC 1154 is also connected to the TA 1158. If a wired charging connector is inserted into the TA 1158, a predetermined voltage, e.g., 5V may be applied to the node 1156. The WPIC 1154 may determine whether the wired charging adaptor has been inserted by monitoring a voltage applied to the node 1156.

The AP 1152 has a stack of predetermined communication schemes, e.g., a WiFi/BT/BLE stack. Accordingly, for communication for wireless charging, the communication unit 1151 may load the stack from the AP 1152 and then communicate with the communication unit 1110 of the wireless power transmitter 1100 based on the stack by BT/BLE.

However, data for wireless power transmission may not be retrieved from the AP 1152, e.g., due to a power-off of the AP 1152, or too much power is lost to maintain an ON state of the AP 1152 while retrieving the data from a memory of the AP 1152 and using the retrieved data.

If the residual power amount of the battery 1159 is below a minimum power limit, the AP 1152 may be turned off and the battery 1159 may be wirelessly charged using some components for wireless charging in the wireless power receiver 1150, e.g., the communication unit 1151, the WPIC 1154, and the resonator 1155. A state in which power sufficient to turn on the AP 1152 cannot be supplied may be referred to as a dead battery state.

Because the AP 1152 is not operated in the dead battery state, the communication unit 1151 may not receive the stack of the predetermined communication schemes from the AP 1152. In preparation for this case, a portion of the stack of the predetermined communication scheme, for example, a BLE stack, may be fetched from the AP 1152 and stored in a memory 1162 of the communication unit 1151. Accordingly, the communication unit 1151 may communicate with the wireless power transmitter 1100 using the stack of the communication scheme stored in the memory 1162 for wireless charging.

The communication unit 1151 may have an internal memory.

The BLE stack may be stored in a Read Only Memory (ROM) in the SA mode.

As described above, a mode in which the communication unit 1151 communicates using the stack of the communication scheme stored in the memory 1162 may be referred to as the SA mode. Accordingly, the communication unit 1151 may manage the charging procedure based on the BLE stack.

Before additional embodiments of the present disclosure are described, cross connection will be described in brief.

A Power Transfer Unit (PTU) periodically senses a load change in a load detection state in order to determine whether a Power Receiving Unit (PRU) is placed on a charging area of the PTU.

Assuming that periodic sensing is performed in 250 ms periods, if two PRUs, i.e., a first PRU and a second PRU, are respectively placed in charging areas of two PTUs, i.e., a first PTU and second PTU, at the same time within a 250 ms period, then at least one of the PRUs may communicate with the wrong PTU. For example, the first PRU may communicate with the second PTU, and the first PTU may also erroneously determine that the charging request has been sent from the first PRU.

Upon receiving power from one of the PTUs, the first PRU transmits an AD signal to search for the PTU where the first PRU is placed. The PTUs send response search frames in response to the search by the first PRU, and the first PRU measures Received Signal Strength Intensity (RSSI) values of the response search frames in order to select a PTU having the highest RSSI value (ideally, the first PTU).

However, if a stronger signal is received from the second PTU by the first PRU, than from the first PTU, the first PRU may erroneously determine that that it is placed in the charging area of the second PTU.

Method for determining cross connection may be implemented variously. For example, in-band Cross Connection Detection (CCD) may include the following methods:

Generating, at a PTU or a PRU, a signal by changing a load, sensing, at a counter PRU or PTU, the signal, and checking if the signal matches a signal given using an out-band scheme to determine cross connection;

Reverse In-band: Changing, at a PRU, a load, and sensing, at a PTU, the load change; and Forward In-band: Transmitting, at a PTU, a modulation signal through transmission power, and sensing, at a PRU, the modulation signal.

However, the in-band CCD has the following problems:

An encoding/decoding circuit and a sensing circuit are required in a PTU and a PRU, and thus, software (SW) for the circuits is required in the PTU and the PRU, increasing complexity;

For reverse In-band, during power transmission, it is difficult to perform sensing due to a load change or noise of PRUs;

If a PRU has a dynamic load, it is difficult to send a predetermined signal; and In multiple charging, signal collision may occur due to simultaneous signal transmission.

Thus, there is a need for a CCD method that does not cause a lot of change to existing wireless charging HW/SW.

In accordance with an embodiment of the present disclosure, after charging starts by control of a PRU, a PTU periodically checks a value $V_{RECT}$ of a PRU Dynamic Parameter and adjusts $I_{TX\_COIL}$ such that a dominant PRU (for example, a PRU having a use rate) reaches a semi $V_{RECT\_SET}$ value (Power Tracking).

If the value $V_{RECT}$ reaches $V_{RECT\_SET}$ after a predetermined time has elapsed, the PTU enters a stabilized stage where $I_{TX\_COIL}$ is maintained unless a load change occurs.

The value $V_{RECT\_SET}$ may be reset using $V_{RECT\_SET\_DYN}$ of the PRU Dynamic Parameter, and once the value $V_{RECT\_SET}$ is reset, the PTU adjusts power or $I_{TX\_COIL}$ to reach new $V_{RECT\_SET}$.

Figure 12:
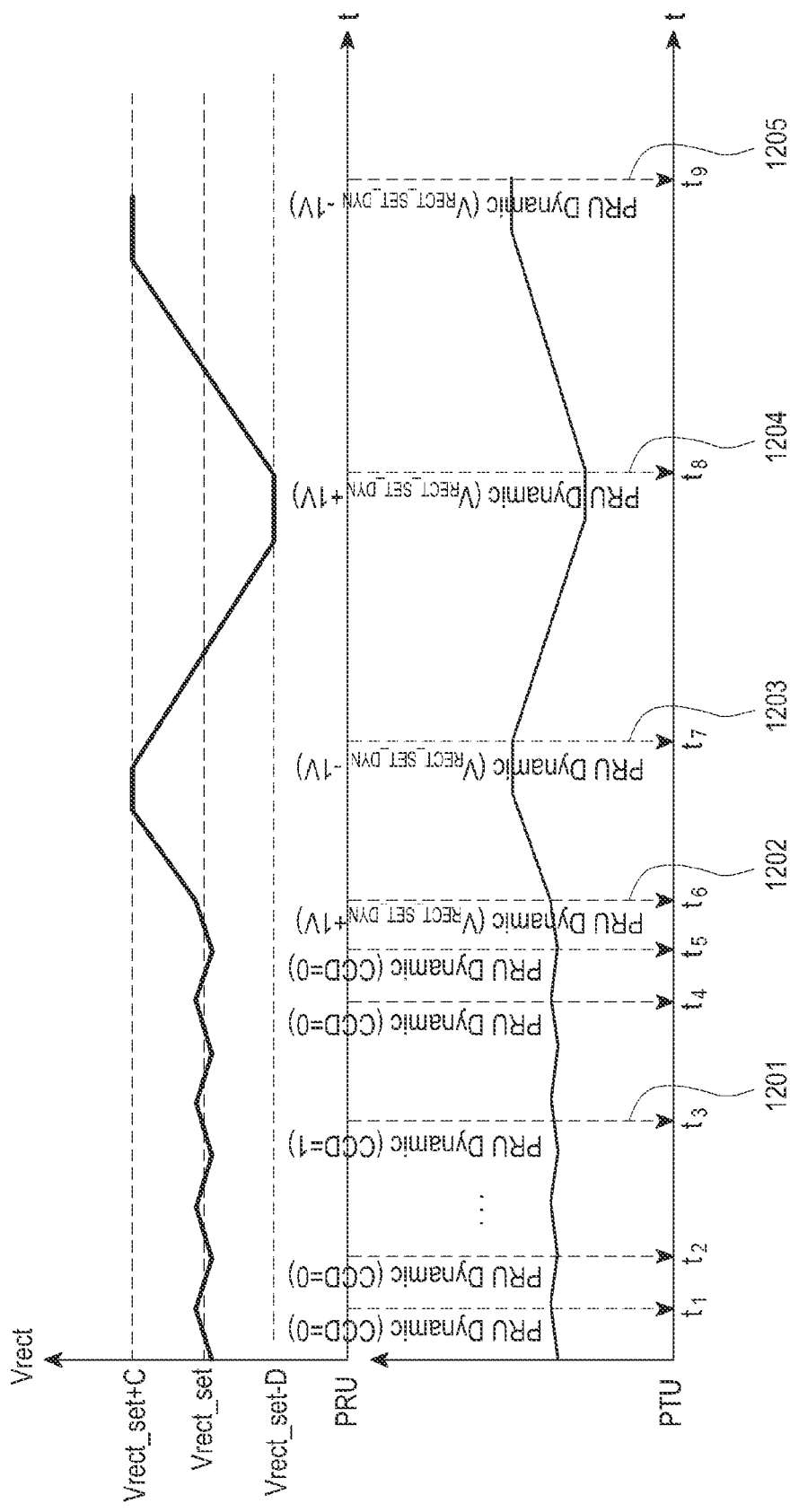
FIG. 12 is a graph illustrating a relationship between a signal transmitted by a wireless power receiver and a voltage of a rectifier according to an embodiment of the present disclosure.

FIG. 12 is a graph illustrating a relationship between a signal transmitted by a wireless power receiver and a voltage of a rectifier according to an embodiment of the present disclosure.

Referring to FIG. 12, the following operations are performed.

First Operation: After power tracking of a PTU is stabilized during charging, $V_{RECT}$ of the PRU approaches $V_{RECT\_SET}$, such that $V_{RECT}$ does not change beyond a predetermined range or more (with an error within A%), and thus, the PRU determines that $V_{RECT}$ is stabilized.

Second Operation: The PRU notifies using the PRU Dynamic Parameter that CCD is to be performed (CCD='1') (1201).

Table 5 shows an example of transmission of information indicating whether to perform CCD in a PRU request field of the PRU Dynamic Parameter.

Table 6 shows an example of information bit setting in the PRU request field.

TABLE 5

| Field | Octets | Description | Use | Units |
|---|---|---|---|---|
| Optional fields validity | 1 | Defines which optional fields are populated | Mandatory | |
| $V_{RECT}$ | 2 | DC voltage at the output of the rectifier. | Mandatory | mV |
| $I_{RECT}$ | 2 | DC current at the output of the rectifier. | Mandatory | mA |
| $V_{OUT}$ | 2 | Voltage at charge/battery port | Optional | mV |
| $I_{OUT}$ | 2 | Current at charge/battery port | Optional | mA |
| Temperature | 1 | Temperature of PRU | Optional | Deg C. from −40 C. |
| $V_{RECT\_MIN\_DYN}$ | 2 | The current dynamic minimum rectifier voltage desired | Optional | mV |
| $V_{RECT\_SET\_DYN}$ | 2 | Desired $V_{RECT}$ (dynamic value) | Optional | mV |
| $V_{RECT\_HIGH\_DYN}$ | 2 | The current dynamic maximum rectifier voltage desired | Optional | mV |
| PRU alert | 1 | Warnings | Mandatory | Bit field |
| PRU request | 1 | PRU request | Mandatory | Bit field |
| RFU | 2 | Undefined | | |

TABLE 6

| 7 | 6 | 5 | 4 | 3 | 2 | 1 | 0 |
|---|---|---|---|---|---|---|---|
| Gap Termination 0 = no action 1 = GAP terminate connection | CCD 0 = no action 1 = CCD check | | | | | | |

Third Operation: Once CCD=1 is sensed, the PTU changes a dominant PRU to a PRU having CCD=1.

Fourth Operation: The PRU waits for a predetermined time of B sec again and the PTU adjusts $I_{TX\_COIL}$, thus approaching $V_{RECT\_SET}$ with an error within A %. Thereafter, by using $V_{RECT\_SET\_DYN}$ of the PRU Dynamic Parameter, $V_{RECT\_SET}$ is increased to $V_{RECT\_SET}=V_{RECT\_SET}+C$ (volt)(1202).

Fifth Operation: If the PRU has not been cross-connected with the PTU, the PTU increases $I_{TX\_COIL}$, and $V_{RECT}$ of the PRU increases close to $V_{RECT}+C$.

Sixth Operation: If $V_{RECT}$ of the PRU approaches new $V_{RECT\_SET\_DYN}(=V_{RECT\_SET}+C)$ with an error within A %, and thus, is stabilized, then the PRU adjusts $V_{RECT\_SET\_DYN}$ to reduce $V_{RECT\_SET\_DYN}$ to $V_{RECT\_SET}=V_{RECT\_SET}-D$(volt) (1203).

Seventh Operation: If the PRU has not been cross-connected with the PTU, the PTU reduces $I_{TX\_COIL}$, and $V_{RECT}$ of the PRU is reduced close to $V_{RECT}-D$.

Eighth Operation: Fourth through seventh operations are repeated several times, and the PRU or the PTU determines whether an adjustment direction of power of the PTU and an increase/decrease direction of $V_{RECT}$ of the PRU are identical to each other (1204 and 1205).

Ninth Operation: The increase/decrease direction of $I_{TX\_COIL}$ of the PTU and the increase/decrease direction of $V_{RECT}$ of the PRU may be affected by another PRU and a load state, and thus, an error may occur. However, if the increase/decrease directions match at a predetermined rate of E % or more, the PTU and the PRU are determined not to be cross connected, and the PTU returns to search for $V_{RECT\_SET}$ of the original dominant PRU.

Tenth Operation: If the increase/decrease direction of $I_{TX\_COIL}$ of the PTU and the increase/decrease direction of $V_{RECT}$ of the PRU do not match at the predetermined rate of E % or more, the PTU and the PRU are determined to be cross connected.

Eleventh Operation: If cross connection occurs, the PRU sends a request for Generic Access Profile (GAP) Termination to the PTU.

Alternatively, upon recognizing occurrence of cross connection, the PTU may send a GAP Termination message to the PRU to terminate communication.

For example, upon determining that cross connection occurs, the PTU notifies the PRU of permission by "Denied due to cross connection" in PRU Control Characteristic as shown in Table 7, and performs a GAP Termination connection procedure with the PRU to terminate communication.

TABLE 7

| Value(Bit) | Description |
|---|---|
| 0000 0000 | Permitted without reason |
| 0000 0001 | Permitted with waiting time due to limited available power |
| 1000 0000 | Denied due to cross connection |
| 1000 0001 | Denied due to limited available power |
| 1000 0010 | Denied due to limited PTU Number of Devices |
| 1000 0011 | Denied due to limited PTU Class support |
| 1000 0100 | Denied due to high temperature at PTU |
| All other values | RFU |

Figure 13:
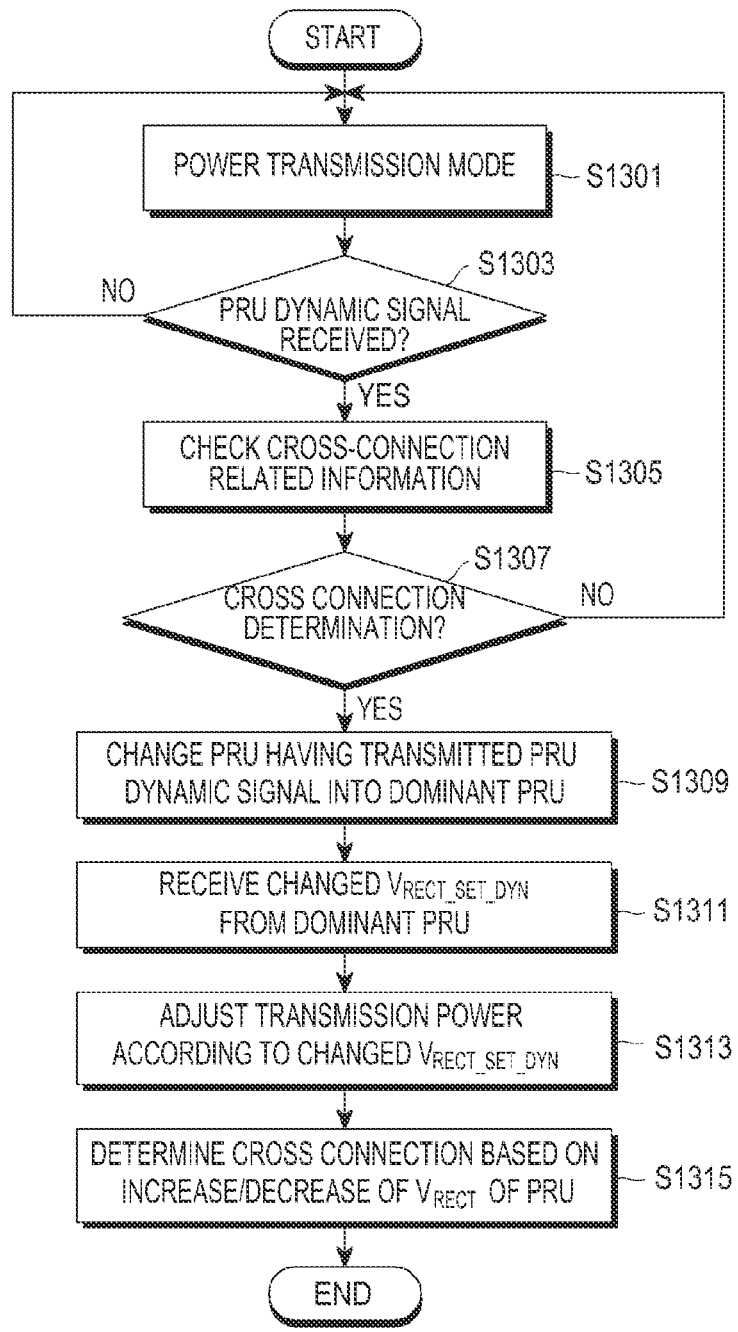
FIG. 13 is a flowchart illustrating an operation for determining a cross connection of a wireless power transmitter according to an embodiment of the present disclosure.

FIG. 13 is a flowchart illustrating a cross connection determination procedure at a wireless power transmitter according to an embodiment of the present disclosure.

Referring to FIG. 13, the wireless power transmitter (or PTU) enters a power transmission mode in step S1301.

In step S1303, the PTU determines if a PRU dynamic signal is received from a PRU If a PRU dynamic signal is received from a PRU in step S1303, then the PTU checks cross connection related information in step S1305. However, if a PRU dynamic signal is not received from a PRU in step S1303, the PTU remains in the power transmission mode in step S1301.

If the PRU dynamic signal includes information indicating determination of cross connection, as shown in Table 5 and Table 6, in step S1307, the PRU having transmitted the PRU dynamic signal is changed as a dominant PRU in step S1309.

Upon receiving changed $V_{RECT\_SET\_DYN}$ from the dominant PRU in step S1311, the PTU adjusts transmission power according to the changed $V_{RECT\_SET\_DYN}$ in step S1313.

In step S1315, the PTU determines whether cross connection occurs based on the increase/decrease of $V_{RECT}$ of the PRU.

Figure 14:
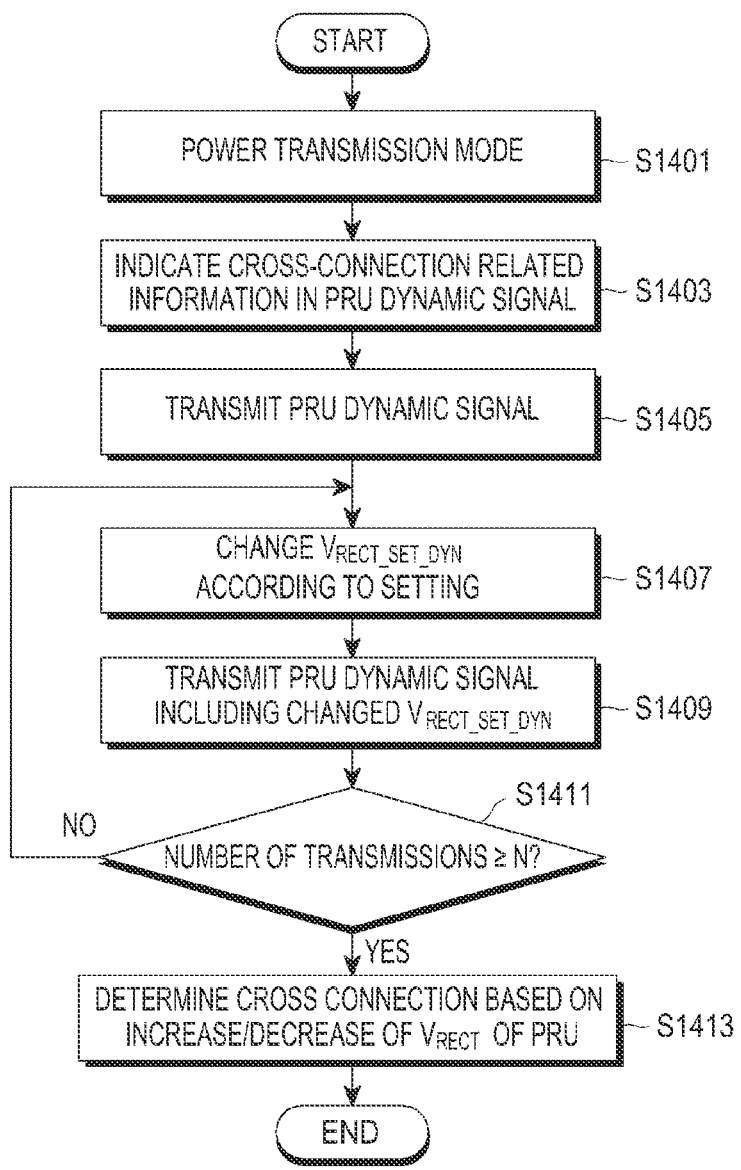
FIG. 14 is a flowchart illustrating an operation for determining a cross connection of a wireless power receiver according to an embodiment of the present disclosure.

FIG. 14 is a flowchart illustrating a cross connection determination procedure at a wireless power receiver according to an embodiment of the present disclosure.

Referring to FIG. 14, the wireless power receiver (or PRU) enters a power transmission mode in step S1401.

In step S1403, the PRU indicates cross connection related information in a PRU dynamic signal.

In step S1405, the PRU transmits a PRU dynamic signal to a PTU.

In step S1407, the PRU changes $V_{RECT\_SET\_DYN}$ according to the foregoing setting. In step S1409, the PRU transmits a PRU dynamic signal including the changed $V_{RECT\_SET\_DYN}$ to the PTU.

If the number of transmissions is greater than a preset number N in step S1411, the PRU determine whether cross connection occurs based on increase/decrease of $V_{RECT}$ of the PRU in step S1413. However, if the number of transmissions is not greater than a preset number N in step S1411, the method returns to step S1407.

As is apparent from the foregoing description, according to the above-described embodiments of the present disclosure, it is possible to prevent a wireless power receiver disposed in another wireless power transmitter from being connected to and receiving wireless charging power from a corresponding wireless power transmitter.

While the present disclosure has been shown and described with reference to certain embodiments thereof, it will be understood by those skilled in the art that various changes in form and details may be made therein without departing from the spirit and scope of the present disclosure as defined by the appended claims and their equivalents.

What is claimed is:

1. A method for determining a cross connection, in a wireless power transmitter, during wireless charging, the method comprising:
   transmitting, by a power transmitter, a first power corresponding to first voltage setting information for charging a wireless power receiver, wherein the second voltage setting information is included in a Power Receiving Unit (PRU) dynamic signal;
   receiving, by a communication circuit, second voltage setting information from the wireless power receiver while transmitting, by the power transmitter, the first power to the wireless power receiver;
   transmitting, by the power transmitter, a second power corresponding to the received second voltage setting information;
   receiving, by the communication circuit, measured voltage information from the wireless power receiver, while transmitting, by the power transmitter, the second power to the wireless power receiver; and
   determining whether a cross connection occurs based at least in part on whether the second voltage setting information corresponds to the measured voltage information.

2. The method of claim 1, wherein transmitting the second power and receiving the measured voltage information are repeated a set number of times, and
   wherein determining whether the cross connection occurs based at least in part on whether the second voltage setting information corresponds to the measured voltage information comprises determining that the cross connection occurs, if a cross connection condition is satisfied a preset number of times as a result of repeatedly transmitting the second power and receiving the measured voltage information the set number of times.

3. The method of claim 1, wherein the second voltage setting information comprises information indicating that a voltage is increased by a preset value from a current voltage indicated by current voltage setting information.

4. The method of claim 1, wherein the second voltage setting information comprises information indicating that a voltage is decreased by a preset value from a current voltage indicated by current voltage setting information.

5. The method of claim 1, wherein determining whether the cross connection occurs comprises determining whether an increase or decrease direction of the second voltage setting information is identical to an increase or decrease direction of the measured voltage information.

6. The method of claim 1, further comprising:
   receiving, from the wireless power receiver, a request for determining cross connection; and
   setting the wireless power receiver to a dominant wireless power receiver.

7. The method of claim 6, wherein the request for determining the cross connection is included in another PRU dynamic signal.

8. A method for determining a cross connection, in a wireless power receiver, during wireless charging, the method comprising:
   receiving, by a power receiver, a first power corresponding to first voltage setting information for charging the wireless power receiver;
   changing voltage setting information to second voltage setting information;
   transmitting, by a communication circuit, the second voltage setting information to a wireless power transmitter while receiving, by the power receiver, the first power from the wireless power transmitter, wherein the second voltage setting information is transmitted through a Power Receiving Unit (PRU) dynamic signal;
   receiving, by the power receiver, a second power from the wireless power transmitter;
   measuring a charging voltage based on the received second power; and
   determining whether a cross connection occurs based at least in part on whether the measured charging voltage corresponds to the second voltage setting information.

9. The method of claim 8, wherein transmitting the second voltage setting information and measuring the charging voltage are repeated a set number of times, and
   wherein determining whether the cross connection occurs based at least in part on whether the measured charging voltage corresponds to the second voltage setting information comprises determining that the cross connection occurs, if a cross connection condition is satisfied a preset number of times as a result of repeatedly transmitting the second voltage setting and measuring the charging voltage the set number of times.

10. The method of claim 8, wherein the second voltage setting information comprises information indicating that a voltage is increased by a preset value from a current voltage indicated by current voltage setting information.

11. The method of claim 8, wherein the second voltage setting information comprises information indicating that a voltage is decreased by a preset value from a current voltage indicated by current voltage setting information.

12. The method of claim 8, wherein determining whether the cross connection occurs comprises determining whether an increase or decrease direction of the second voltage setting information is identical to an increase or decrease direction of the measured charging voltage.

13. The method of claim 8, further comprising transmitting a request for determining cross connection.

14. The method of claim 13, wherein the request for determining the cross connection is transmitted through another PRU dynamic signal.

15. An apparatus for determining a cross connection during wireless charging, the apparatus comprising:

a power transmitter for transmitting a first power corresponding to first voltage setting information for charging a wireless power receiver;

a transceiver for receiving second voltage setting information from the wireless power receiver while transmitting, by the power transmitter, the first power to the wireless power receiver, wherein the second voltage setting information is included in a Power Receiving Unit (PRU) dynamic signal; and a controller for controlling the power transmitter to transmit a second power corresponding to the received second voltage setting information, controlling the transceiver to receive measured voltage information from the wireless power receiver, and determining whether a cross connection occurs based at least in part on whether the second voltage setting information corresponds to the measured voltage information.

16. The apparatus of claim 15, wherein the second power is repeatedly transmitted and the measured voltage information is repeatedly received a set number of times, and wherein the controller determines that the cross connection occurs, if a cross connection condition is satisfied a preset number of times as a result of repeatedly transmitting the second power and receiving the measured voltage information the set number of times.

17. The apparatus of claim 15, wherein the second voltage setting information comprises information indicating that a voltage is increased by a preset value from a current voltage indicated by current voltage setting information.

18. The apparatus of claim 15, wherein the second voltage setting information comprises information indicating that a voltage is decreased by a preset value from a current voltage indicated by current voltage setting information.

19. The apparatus of claim 15, wherein the controller determines whether the cross connection occurs by determining whether an increase or decrease direction of the second voltage setting information is identical to an increase or decrease direction of the measured voltage information.

20. The apparatus of claim 15, wherein the transceiver receives, from the wireless power receiver, a request for determining cross connection, and wherein the controller sets the wireless power receiver to a dominant wireless power receiver.

21. The apparatus of claim 20, wherein the request for determining the cross connection is included in another PRU dynamic signal.

22. An apparatus for determining a cross connection during wireless charging, the apparatus comprising:

a power receiver for receiving a first power from a wireless power transmitter for charging the apparatus;

a controller for changing voltage setting information to second voltage setting information; and a transceiver for transmitting the second voltage setting information to a wireless power transmitter while receiving, by the power receiver, the first power from the wireless power transmitter, wherein the second voltage setting information is transmitted through a Power Receiving Unit (PRU) dynamic signal, wherein, while receiving a second power from the wireless power transmitter, the controller measures a charging voltage based on the received second power, and determines whether a cross connection occurs, based at least in part on whether the measured charging voltage corresponds to the second voltage setting information.

23. The apparatus of claim 22, wherein the second voltage setting information is repeatedly transmitted and the charging voltage is repeatedly measured a set number of times, and wherein the controller determines that the cross connection occurs, if a cross connection condition is satisfied a preset number of times as a result of repeatedly transmitting the second voltage setting and measuring the charging voltage the set number of times.

24. The apparatus of claim 22, wherein the second voltage setting information comprises information indicating that a voltage is increased by a preset value from a current voltage indicated by current voltage setting information.

25. The apparatus of claim 22, wherein the second voltage setting information comprises information indicating that a voltage is decreased by a preset value from a current voltage indicated by current voltage setting information.

26. The apparatus of claim 22, wherein the controller determines whether the cross connection occurs by determining whether an increase or decrease direction of the second voltage setting information is identical to an increase or decrease direction of the measured charging voltage.

27. The apparatus of claim 22, wherein the transmitter transmits a request for determining cross connection.

28. The apparatus of claim 27, wherein the request for determining the cross connection is transmitted through another PRU dynamic signal.

* * * * *